US012751445B2

(12) United States Patent
Litwin

(10) Patent No.: US 12,751,445 B2
(45) Date of Patent: Oct. 6, 2026

(54) PORTABLE HUNTING BLIND BASE AND ACCESSORIES THEREFOR, INCLUDING A WHEELED ARRANGEMENT

(71) Applicant: Christopher J. Litwin, Pittsburgh, PA (US)

(72) Inventor: Christopher J. Litwin, Pittsburgh, PA (US)

(73) Assignee: Christopher J. Litwin, Pittsburgh, PA (US)

( * ) Notice: Subject to any disclaimer, the term of this patent is extended or adjusted under 35 U.S.C. 154(b) by 536 days.

(21) Appl. No.: 18/272,912

(22) PCT Filed: Jan. 17, 2022

(86) PCT No.: PCT/US2022/012670
§ 371 (c)(1),
(2) Date: Jul. 18, 2023

(87) PCT Pub. No.: WO2022/155571
PCT Pub. Date: Jul. 21, 2022

(65) Prior Publication Data

US 2024/0081317 A1 Mar. 14, 2024

Related U.S. Application Data

(60) Provisional application No. 63/233,032, filed on Aug. 13, 2021, provisional application No. 63/138,606, filed on Jan. 18, 2021.

(51) Int. Cl.
*A01M 31/02* (2006.01)
*A47B 85/06* (2006.01)
(Continued)

(52) U.S. Cl.
CPC ............. *A01M 31/02* (2013.01); *A47B 85/06* (2013.01); *B62B 1/12* (2013.01); *F16M 11/32* (2013.01);
(Continued)

(58) Field of Classification Search
CPC . B62B 1/12; B62B 2206/006; B62B 2301/05; B62B 1/10; B62B 1/00;
(Continued)

(56) References Cited

U.S. PATENT DOCUMENTS 3,054,622 A * 9/1962 Davis .................. A45C 13/385 280/47.3
3,556,451 A * 1/1971 Ostlund .................. F16B 12/48 248/188
(Continued)

FOREIGN PATENT DOCUMENTS

RU 2449330 C1 * 4/2012

*Primary Examiner* — Brian D Mattei
*Assistant Examiner* — Kathleen M. McFarland
(74) *Attorney, Agent, or Firm* — The Webb Law Firm

(57) ABSTRACT

A portable stand may include a base member transitionable between a folded and unfolded position; at least one wheel arrangement mounted to the base member; and a plurality of adjustable support members to support the base member. The portable stand may be is transitionable between a first position and a second position. In the first position, the base member may be in the folded position, and the at least one wheel arrangement may be mounted to the folded base member, permitting a user of the portable stand to transport the portable stand. In the second position, the base member may be in the unfolded position, the at least one wheel arrangement may be detached from the base member, and the plurality of adjustable support members may be in contact with a surface, permitting a user to be supported by the unfolded base member.

17 Claims, 19 Drawing Sheets

(51) Int. Cl.
*B62B 1/12* (2006.01)
*F16M 11/32* (2006.01)

(52) U.S. Cl.
CPC ..... *B62B 2206/006* (2013.01); *B62B 2301/05* (2013.01)

(58) Field of Classification Search
CPC ......... B62B 1/04; B62B 5/0083; A47B 85/06; A47B 13/003; A47B 13/021; A47B 47/0091; A47B 2210/0043; A47B 2003/0821; A47B 3/0815; A47B 2230/07; A47B 57/16; A47B 2013/022; A47B 2230/11; A47B 2095/046; A47B 2200/0034; A01M 31/02; A01M 31/006; A01M 31/025; E04H 15/001; E04H 15/48; E04H 15/44; E04H 1/1205; E04H 15/46; Y10S 135/901; Y10S 224/921; Y10S 135/912; F16M 11/32
See application file for complete search history.

(56) References Cited

U.S. PATENT DOCUMENTS 3,960,240 A * 6/1976 Cotton .................. A63B 27/00 182/20
4,003,537 A * 1/1977 Mutchnik .............. F16B 9/052 248/188
4,565,382 A * 1/1986 Sherman ................. A47B 3/10 D34/21
5,201,536 A * 4/1993 Bono ....................... B62B 1/12 280/30
5,328,192 A * 7/1994 Thompson ............. B62B 19/04 280/43.1
5,388,796 A * 2/1995 Sullivan .............. A47B 57/567 248/222.51
5,492,196 A * 2/1996 Michno ................ A01M 31/02 182/20
5,624,008 A * 4/1997 Beardslee, Jr. ........ A63B 27/00 182/20
5,642,895 A * 7/1997 Wunder ................... B62B 1/12 280/30
6,142,491 A * 11/2000 Darling, III ......... B62K 27/003 280/30
6,505,707 B1 * 1/2003 Berry ....................... E06C 1/12 182/20
6,516,919 B1 * 2/2003 Sempel ................ A01M 31/02 182/20
6,733,026 B1 * 5/2004 Robberson .............. B62B 3/007 280/30
7,967,325 B1 * 6/2011 Burton ...................... E06C 5/04 280/47.24
8,376,391 B2 * 2/2013 Voves ....................... B62B 1/12 280/47.26
8,382,390 B2 * 2/2013 Cheng .................... A47D 1/004 403/109.8
8,596,671 B2 * 12/2013 Myrant ................... B62B 1/208 280/655
8,608,188 B2 * 12/2013 Goldszer .................. A47B 3/08 280/651
8,777,254 B1 * 7/2014 Fowler .................. A01M 31/02 280/656
8,876,129 B2 * 11/2014 Pizzi Spadoni ........ A61G 1/013 280/607
D723,762 S * 3/2015 Treadwell ...................... D34/17
8,967,651 B1 * 3/2015 Simic ................... B62K 27/003 280/30
9,050,992 B2 * 6/2015 Smith ...................... B25H 1/04
9,162,692 B2 * 10/2015 Rice ....................... A47C 13/00
9,265,244 B2 * 2/2016 Vandergraff .......... A01M 31/02
9,568,143 B2 * 2/2017 Ben Meir .............. F16M 11/34
9,630,666 B1 * 4/2017 Keene ................. B62D 63/061
9,877,472 B2 * 1/2018 Ketz ......................... E06C 1/39
10,160,467 B2 * 12/2018 Josephsen ................. B62B 1/12
10,314,390 B2 * 6/2019 Waggoner ............ A47B 3/0809
10,645,920 B2 * 5/2020 Litwin .................... E04H 15/56
10,759,457 B1 * 9/2020 Chang ....................... B62B 1/12
11,554,800 B2 * 1/2023 Su ........................... B62B 5/067
11,751,562 B1 * 9/2023 Kohler ................... B62D 63/06 182/116
12,490,827 B2 * 12/2025 Coghlan .................. A47B 3/12
2007/0216116 A1 * 9/2007 Gallea ....................... B62B 3/02 280/47.36
2007/0235255 A1 * 10/2007 Wallace ................ A01M 31/02 182/20
2008/0203704 A1 * 8/2008 McCracken .............. B62B 1/12 280/651
2010/0066069 A1 * 3/2010 Bradshaw ................ B60R 9/06 280/769
2010/0078907 A1 * 4/2010 Voves ....................... B62B 1/12 280/47.24
2012/0104193 A1 * 5/2012 Cheng .................. A47B 13/021 248/188.8
2012/0104731 A1 * 5/2012 Goldszer ................ B62B 1/008 280/651
2012/0133112 A1 * 5/2012 Myrant ................... B62B 1/208 280/655
2013/0001907 A1 * 1/2013 Pizzi Spadoni ...... A61G 1/0293 280/47.33
2013/0118818 A1 * 5/2013 Smith ...................... B25H 1/04 280/30
2013/0341878 A1 * 12/2013 Harris ...................... A47B 3/10 280/30
2014/0151154 A1 * 6/2014 Sama, II ............... A01M 31/02 182/223
2014/0238776 A1 * 8/2014 Vandergraff ........ A01M 31/006 182/20
2015/0054236 A1 * 2/2015 Rice ....................... A47C 13/00 280/30
2015/0152998 A1 * 6/2015 Intravatola ............. F21V 21/22 248/528
2018/0000063 A1 * 1/2018 Ketz ................... A01M 31/006
2018/0014529 A1 * 1/2018 Litwin ................ A01M 31/025
2018/0194381 A1 * 7/2018 Josephsen ................. B62B 1/20
2018/0360205 A1 * 12/2018 Waggoner ............. E04H 1/1255
2020/0022359 A1 * 1/2020 Ketz ..................... A01M 31/02
2020/0223462 A1 * 7/2020 Ferree, Jr. ............... B62B 5/067
2020/0267968 A1 * 8/2020 Litwin ..................... A47B 3/08
2020/0307665 A1 * 10/2020 Su ........................... B62B 3/022
2024/0081317 A1 * 3/2024 Litwin ...................... B62B 1/12
2025/0145199 A1 * 5/2025 Litwin .................... B62B 1/268

* cited by examiner

PORTABLE HUNTING BLIND BASE AND ACCESSORIES THEREFOR, INCLUDING A WHEELED ARRANGEMENT

CROSS-REFERENCE TO RELATED APPLICATIONS

This application is the United States national phase of International Application No. PCT/US22/12670 filed Jan. 17, 2022, and claims priority to U.S. Provisional Application Ser. No. 63/138,606, filed Jan. 18, 2021, and U.S. Provisional Application Ser. No. 63/233,032 filed Aug. 13, 2021, the disclosures of which are hereby incorporated by reference in their entireties.

BACKGROUND OF THE INVENTION

Field of the Invention

This disclosure relates generally to a portable wheel arrangement for moving carriers, platforms, carts, and other devices across open terrain, and, in particular, to a portable hunting blind base with accessories such as a wheeled arrangement and adjustable legs or supports.

Description of Related Art

Hunting blinds are typically used by hunters to conceal or camouflage the hunter's position and/or scent when hunting. This increases the hunter's chances of avoiding detection by animals and having a successful hunt. Conventional hunting blinds are placed on a ground surface in a forest or field with the hunter's equipment typically being placed on the ground surface within the hunting blind. The equipment can pose as an obstacle to the hunter that not only limits his or her range of movement within the hunting blind but also creates an opportunity for the hunter to create unwanted noise by tripping over the equipment or by needing to move the equipment to a different location within the blind. This noise can distract or scare nearby animals. Conventional hunting blinds typically require a flat surface at a hunting location and cannot be set up on hills or generally uneven or angled surfaces.

Conventional hunting blinds are also cumbersome to move. They take time to deconstruct, which also creates unwanted noise. Taking into account additional gear and supplies hunters carry with them, moving the hunting blind to a new location can be a cumbersome and exhaustive process. Unfortunately, changes in wind direction may make it necessary for a hunter to move locations. The wind may blow a hunter's scent into the area in which is he expecting animals to pass through. If a human scent passes through this area, then animals are likely to pick it up and not travel through, making it less likely for the hunter to encounter an animal to hunt. To prevent this, the hunting blind must be moved so that the scent of a hunter does not give away his or her location to the hunted animals.

Accordingly, a need exists for an apparatus that can both support a hunting blind on uneven ground and provide a hunter with enough space to allow a hunter to keep his or her equipment comfortably within the blind. There also exists a need for an apparatus to support a hunting blind that can be moved with relatively little hassle across a field or hunting area and be quickly set up again to take advantage of or respond to changing conditions.

SUMMARY OF THE INVENTION

The present disclosure is directed to a portable stand. In one embodiment or aspect of the present disclosure, the portable stand may include a base member transitionable between a folded position and an unfolded position; at least one wheel arrangement comprising at least one wheel, the at least one wheel arrangement detachably mounted to the base member; and a plurality of adjustable support members configured to support the base member on a surface. The portable stand may be is transitionable between a first position and a second position. In the first position, the base member may be in the folded position, and the at least one wheel arrangement may be mounted to the folded base member, thereby permitting a user of the portable stand to transport the portable stand across a distance. In the second position, the base member may be in the unfolded position, the at least one wheel arrangement may be detached from the base member, and the plurality of adjustable support members may be in contact with the surface, thereby permitting the user of the hunting stand to be supported by the unfolded base member.

In some embodiments or aspects, the first side of the base member may include at least one attachment bar disposed at least partially therein. The at least one wheel arrangement may include at least one attachment hook corresponding to the at least one attachment bar, and the at least one attachment bar and the at least one attachment hook may be configured to mount the at least one wheel arrangement to the base member. The first side of the base member may include at least four attachment bars disposed at least partially therein, and the at least one wheel arrangement may include at least four attachment hooks, each corresponding to one of the at least four attachment bars. The at least one wheel arrangement may include a first wheel support and a second wheel support, the first wheel support and the second wheel support may each have at least one attachment hook located at a first end and configured to engage with a corresponding at least one attachment bar. The first wheel support and the second wheel support may define at least one wheel receiving shaft configured to receive at least a portion of the at least one wheel therein, and the at least one wheel receiving shaft may be located at a second end, opposite the first end.

In some embodiments or aspects, the at least one wheel receiving shaft may include a first wheel receiving shaft, configured to receive a first wheel therein; and a second wheel receiving shaft, configured to receive a second wheel therein. The first wheel receiving shaft and the second wheel receiving shaft may share a commen axis, and the first wheel support and the second wheel support, upon their respective at least one attachment hook engaging with their respective at least one attachment bar, may be configured to align so that a portion of each defines the first wheel receiving shaft and the second wheel receiving shaft. The first wheel may include a first extension and the second wheel may include a second extension, the first extension being configured to be received within the first wheel receiving shaft, and the second extension being configured to be received within the second wheel receiving shaft. The first wheel receiving shaft and the second wheel receiving shaft may include a locking pin configured to be displaceable relative to the receiving shafts and configured to engage and lock the first and second extensions in their respective receiving shafts. In the folded position, the plurality of adjustable support members may be held within the base member. The plurality of adjustable support members may be configured to support the base member on a surface in the unfolded position, and a length of each of the plurality of adjustable support members may be independently adjustable.

In some embodiments or aspects of the present disclosure, a portable stand may include: a base member transitionable between a folded position and an unfolded position; a plurality of adjustable support members configured to support the base member on a surface; at least one handle detachably mounted to the base member; and at least one wheel arrangement comprising at least one wheel, the at least one wheel arrangement detachably mounted to the base member. The portable stand may be transitionable between a first position and a second position. In the first position, the plurality of adjustable support members may be held within a folded base member. In the second position, the plurality of adjustable support members may be configured to extend from a bottom surface of an unfolded base member. A length of each of the plurality of adjustable support members may be independently adjustable so that the portable stand can be supported on an uneven surface.

In some embodiments or aspects the plurality of adjustable support members may include: a base portion, mounted to the bottom surface of the unfolded base member; an extension portion, configured to be extendable from the base portion; a locking member operatively connected to the base portion and configured to lock the extension portion in place relative to the base portion; and a foot, mounted to an end of the extension portion and configured to engage the surface. A surface of the extension portion may include a plurality of steps. The locking member may include a push tab and a locking tab configured to engage with at least one of the plurality of steps, thereby locking the extension portion in place, and upon a user pressing the push tab, the locking tab may disengage the at least one of the plurality of steps to permit movement. At least a portion of the extension portion may be telescopically received within the base portion. The plurality of adjustable support members may be connected to the bottom surface of the unfolded base member by a plurality of mounting brackets, each of the plurality of mounting brackets corresponding to one of the plurality of adjustable support members.

In some embodiments or aspects, the plurality of mounting brackets may include: a base bracket, connected to the bottom surface of the unfolded base member; a rotatable extension extending from the base bracket, the rotatable extension configured to be mounted to the base portion of the plurality of adjustable support members; and a hinge pin about which the plurality of adjustable support members rotate, the hinge pin extending through the base support and rotatable extension, thereby connecting the rotatable extension to the base support. The rotatable extension may be telescopically received within the base portion. The plurality of mounting brackets may further include: a first side bracket and a second side bracket, the first side bracket and the second side bracket defining an opening configured to permit rotation of the rotatable extension and base portion therebetween.

In some embodiments or aspects of the present disclosure, a wheel arrangement for use with a portable support may include: a first wheel support having a first end and a second end; and a second wheel support having a first end and a second end; at least one wheel detachably mounted to the first wheel support and the second wheel support at the first ends of each. The first wheel support may include at least one attachment mechanism at the second end, the at least one attachment mechanism configured to detachably mount the first wheel support to the portable support. The second wheel support may include at least one attachment mechanism at the second end, the at least one attachment mechanism configured to detachably mount the second wheel support to the portable support. The first wheel support may include at least one wheel receiving shaft at the first end and the second wheel support comprises at least one wheel receiving shaft at the first end. The at least one wheel receiving shaft of the first wheel support may be configured to align with the at least one wheel receiving shaft of the second wheel support to receive the at least one wheel therein. The at least one wheel may include a first wheel and a second wheel. The at least one wheel receiving shaft of the first wheel support may include a first wheel receiving shaft and a second wheel receiving shaft opposing the first wheel receiving shaft at the first end of the first wheel support. The at least one wheel receiving shaft of the second wheel support may include a first wheel receiving shaft and a second wheel receiving shaft opposing the first wheel receiving shaft at the first end of the second wheel support. The first wheel receiving shaft on the first wheel support may be configured to align with the first wheel receiving shaft on the second wheel support to receive the first wheel therein. The second wheel receiving shaft on the first wheel support may be configured to align with the second wheel receiving shaft on the second wheel support to receive the second wheel therein.

In some embodiments or aspects, the present disclosure may be characterized by one or more of the following numbered clauses:

Clause 1: A portable stand comprising: a base member transitionable between a folded position and an unfolded position; at least one wheel arrangement comprising at least one wheel, the at least one wheel arrangement detachably mounted to the base member; and a plurality of adjustable support members configured to support the base member on a surface, wherein the portable stand is transitionable between a first position and a second position, wherein, in the first position, the base member is in the folded position and the at least one wheel arrangement is mounted to the folded base member, thereby permitting a user of the portable stand to transport the portable stand across a distance, and wherein, in the second position, the base member is in the unfolded position, the at least one wheel arrangement is detached from the base member, and the plurality of adjustable support members are in contact with the surface, thereby permitting the user of the hunting stand to be supported by the unfolded base member.

Clause 2. The portable stand of clause 1, wherein a first side of the base member comprises at least one attachment bar disposed at least partially therein, wherein the at least one wheel arrangement comprises at least one attachment hook corresponding to the at least one attachment bar, wherein the at least one attachment bar and the at least one attachment hook are configured to mount the at least one wheel arrangement to the base member.

Clause 3. The portable stand of clause 1 or 2, wherein the first side of the base member comprises at least four attachment bars disposed at least partially therein, and wherein the at least one wheel arrangement comprises at least four attachment hooks, each corresponding to one of the at least four attachment bars.

Clause 4. The portable stand of any of clauses 1-3, wherein the at least one wheel arrangement comprises a first wheel support and a second wheel support, the first wheel support and the second wheel support each having at least one attachment hook located at a first end and configured to engage with a corresponding at least one attachment bar, wherein the first wheel support and the second wheel support define at least one wheel receiving shaft configured to receive at least a portion of the at least one wheel therein, and wherein the at least one wheel receiving shaft is located at a second end, opposite the first end.

Clause 5. The portable stand of any of clauses 1-4, wherein the at least one wheel receiving shaft comprises: a first wheel receiving shaft, configured to receive a first wheel therein; and a second wheel receiving shaft, configured to receive a second wheel therein, wherein the first wheel receiving shaft and the second wheel receiving shaft share a common axis, and wherein the first wheel support and the second wheel support, upon their respective at least one attachment hook engaging with their respective at least one attachment bar, are configured to align so that a portion of each defines the first wheel receiving shaft and the second wheel receiving shaft.

Clause 6. The portable stand of any of clauses 1-5, wherein the first wheel comprises a first extension and the second wheel comprises a second extension, the first extension being configured to be received within the first wheel receiving shaft, and the second extension being configured to be received within the second wheel receiving shaft.

Clause 7. The portable stand of any of clauses 1-6, wherein the first wheel receiving shaft and the second wheel receiving shaft comprise a locking pin configured to be displaceable relative to the receiving shafts and configured to engage and lock the first and second extensions in their respective receiving shafts.

Clause 8. The portable stand of any of clauses 1-7, wherein, in the folded position, the plurality of adjustable support members are held within the base member.

Clause 9. The portable stand of any of clauses 1-8, wherein the plurality of adjustable support members are configured to support the base member on a surface in the unfolded position, and wherein a length of each of the plurality of adjustable support members is independently adjustable Clause 10. A portable stand comprising: a base member transitionable between a folded position and an unfolded position; a plurality of adjustable support members configured to support the base member on a surface; at least one handle detachably mounted to the base member; and at least one wheel arrangement comprising at least one wheel, the at least one wheel arrangement detachably mounted to the base member, wherein the portable stand is transitionable between a first position and a second position, wherein in the first position, the plurality of adjustable support members are held within a folded base member, wherein in the second position, the plurality of adjustable support members are configured to extend from a bottom surface of an unfolded base member, and wherein a length of each of the plurality of adjustable support members is independently adjustable so that the portable stand can be supported on an uneven surface.

Clause 11. The portable stand of clause 11, wherein the plurality of adjustable support members comprise: a base portion, mounted to the bottom surface of the unfolded base member; an extension portion, configured to be extendable from the base portion; a locking member operatively connected to the base portion and configured to lock the extension portion in place relative to the base portion; and a foot, mounted to an end of the extension portion and configured to engage the surface.

Clause 12. The portable stand of clause 10 or 11, wherein a surface of the extension portion comprises a plurality of steps, wherein the locking member comprises a push tab and a locking tab configured to engage with at least one of the plurality of steps, thereby locking the extension portion in place, and wherein, upon a user pressing the push tab, the locking tab disengages the at least one of the plurality of steps to permit movement.

Clause 13. The portable stand of any of clauses 10-12, wherein at least a portion of the extension portion is telescopically received within the base portion.

Clause 14. The portable stand of any of clauses 10-13, wherein the plurality of adjustable support members are connected to the bottom surface of the unfolded base member by a plurality of mounting brackets, each of the plurality of mounting brackets corresponding to one of the plurality of adjustable support members.

Clause 15. The portable stand of any of clauses 10-14, wherein the plurality of mounting brackets comprise: a base bracket, connected to the bottom surface of the unfolded base member; a rotatable extension extending from the base bracket, the rotatable extension configured to be mounted to the base portion of the plurality of adjustable support members; and a hinge pin about which the plurality of adjustable support members rotate, the hinge pin extending through the base support and rotatable extension, thereby connecting the rotatable extension to the base support.

Clause 16. The portable stand of any of clauses 10-15, wherein the rotatable extension is telescopically received within the base portion.

Clause 17. The portable stand of any of clauses 10-16, wherein the plurality of mounting brackets further comprise: a first side bracket and a second side bracket, the first side bracket and the second side bracket defining an opening configured to permit rotation of the rotatable extension and base portion therebetween.

Clause 18. A wheel arrangement of ruse with a portable support, the wheel arrangement comprising: a first wheel support having a first end and a second end; and a second wheel support having a first end and a second end; at least one wheel detachably mounted to the first wheel support and the second wheel support at the first ends of each, wherein the first wheel support comprises at least one attachment mechanism at the second end, the at least one attachment mechanism configured to detachably mount the first wheel support to the portable support, and wherein the second wheel support comprises at least one attachment mechanism at the second end, the at least one attachment mechanism configured to detachably mount the second wheel support to the portable support.

Clause 19. The wheel arrangement of clause 18, wherein the first wheel support comprises at least one wheel receiving shaft at the first end and the second wheel support comprises at least one wheel receiving shaft at the first end, wherein the at least one wheel receiving shaft of the first wheel support is configured to align with the at least one wheel receiving shaft of the second wheel support to receive the at least one wheel therein.

Clause 20. The wheel arrangement of clause 18 or 19, wherein the at least one wheel comprises a first wheel and a second wheel, wherein the at least one wheel receiving shaft of the first wheel support comprises a first wheel receiving shaft and a second wheel receiving shaft opposing the first wheel receiving shaft at the first end of the first wheel support, wherein the at least one wheel receiving shaft of the second wheel support comprises a first wheel receiving shaft and a second wheel receiving shaft opposing the first wheel receiving shaft at the first end of the second wheel support, wherein the first wheel receiving shaft on the first wheel support is configured to align with the first wheel receiving shaft on the second wheel support to receive the first wheel therein, and wherein the second wheel receiving shaft on the first wheel support is configured to align with the second wheel receiving shaft on the second wheel support to receive the second wheel therein.

DETAILED DESCRIPTION OF THE DISCLOSURE

For purposes of the description hereinafter, the terms “upper”, “lower”, “right”, “left”, “vertical”, “horizontal”, “top”, “bottom”, “lateral”, “longitudinal”, and derivatives thereof shall relate to the disclosure as it is oriented in the figures. However, it is to be understood that the disclosure may assume alternative variations and step sequences, except where expressly specified to the contrary. It is also to be understood that the specific devices and processes illustrated in the attached drawings and described in the following specification are simply exemplary aspects of the disclosure. Hence, specific dimensions and other physical characteristics related to the aspects disclosed herein are not to be considered as limiting.

The present disclosure is directed to, in general, a portable hunting blind base with accessories 10. While the majority of this disclosure will be directed to a portable hunting blind base, one will appreciate that a portable stand described herein can be used for other functions such as providing an outdoor portable work station. Throughout the application, the portable hunting blind base with accessories will be labeled with element number 10; however the combination of the portable hunting blind base and accessories will generally be referred to as a portable hunting blind base. It is also to be understood that the present disclosure is also directed to carriers, carts, and storage containers that include a portable wheel arrangement to assist in easily moving the carriers, carts, and storage containers across open terrain that would otherwise be difficult to traverse without the portable wheel arrangement. The carriers, carts, and storage containers may include garden carts, hunting carts, construction carts and storage containers, and toy storage containers, among others.

Figure 1:
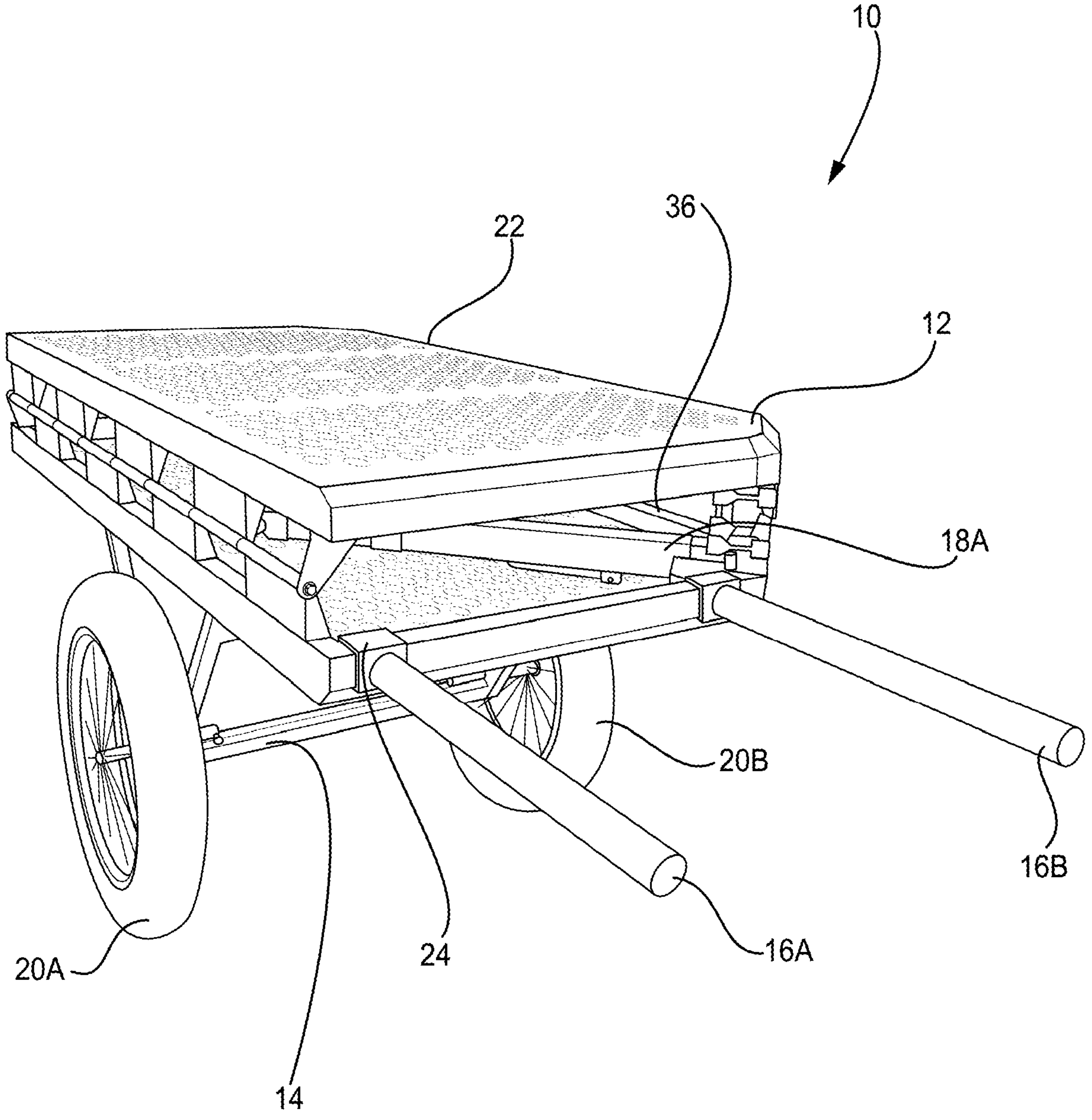
FIG. 1 is a perspective view of a portable hunting blind base assembly according to one embodiment or aspect of the present disclosure.
Figure 2:
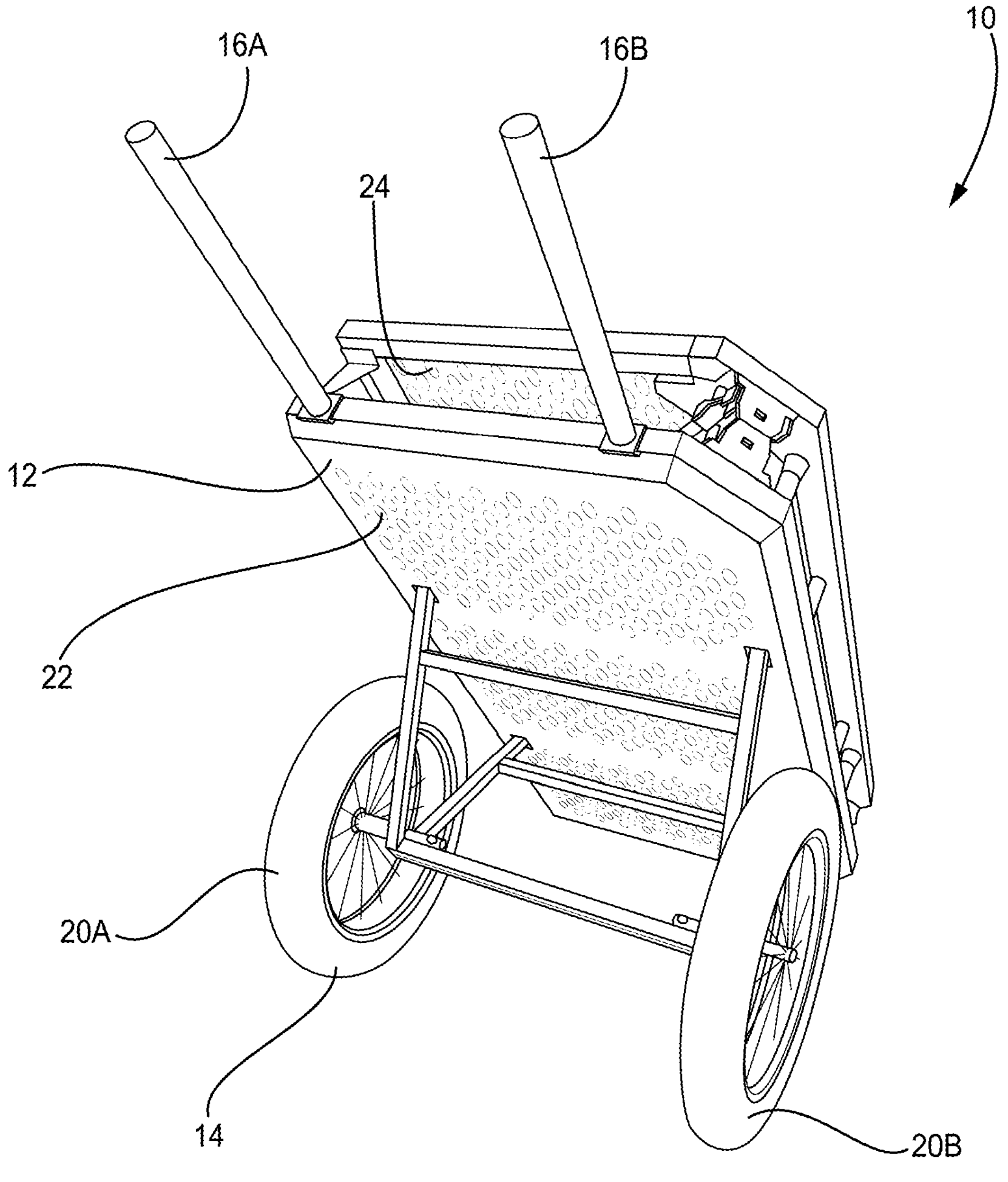
FIG. 2 is another perspective view of the portable hunting blind base assembly of FIG. 1.

Referring to FIGS. 1 and 2, the portable hunting blind base 10 according to one aspect or embodiment is shown in a transport position. The portable hunting blind base 10 includes a foldable base 12. Extending from the base 12 is a wheel arrangement 14 and handles 16A, 16B. Adjustable support members or adjustable support legs 18 are folded within the base 12. In the transport position, the portable hunting blind base 10 is supported by wheels 20A, 20B of the wheel arrangement 14, and handles 16A, 16B are attached to and extend from an edge of the base 12. In this configuration, a hunter can grip the handles 16A, 16B and roll the portable hunting blind base 10 across various terrains so that it can be set up in a new location. While only two poles are shown as the handles 16A, 16B, it is understood that the handles 16A, 16B may take any shape that allows a hunter to roll the portable hunting blind base 10 across a terrain. There may only be one handle for a hunter to grab or more than two handles if multiple hunters are to grip and roll the portable hunting blind base 10. In any arrangement, the handles 16A, 16B may be detachable from the base 12.

Figure 17:
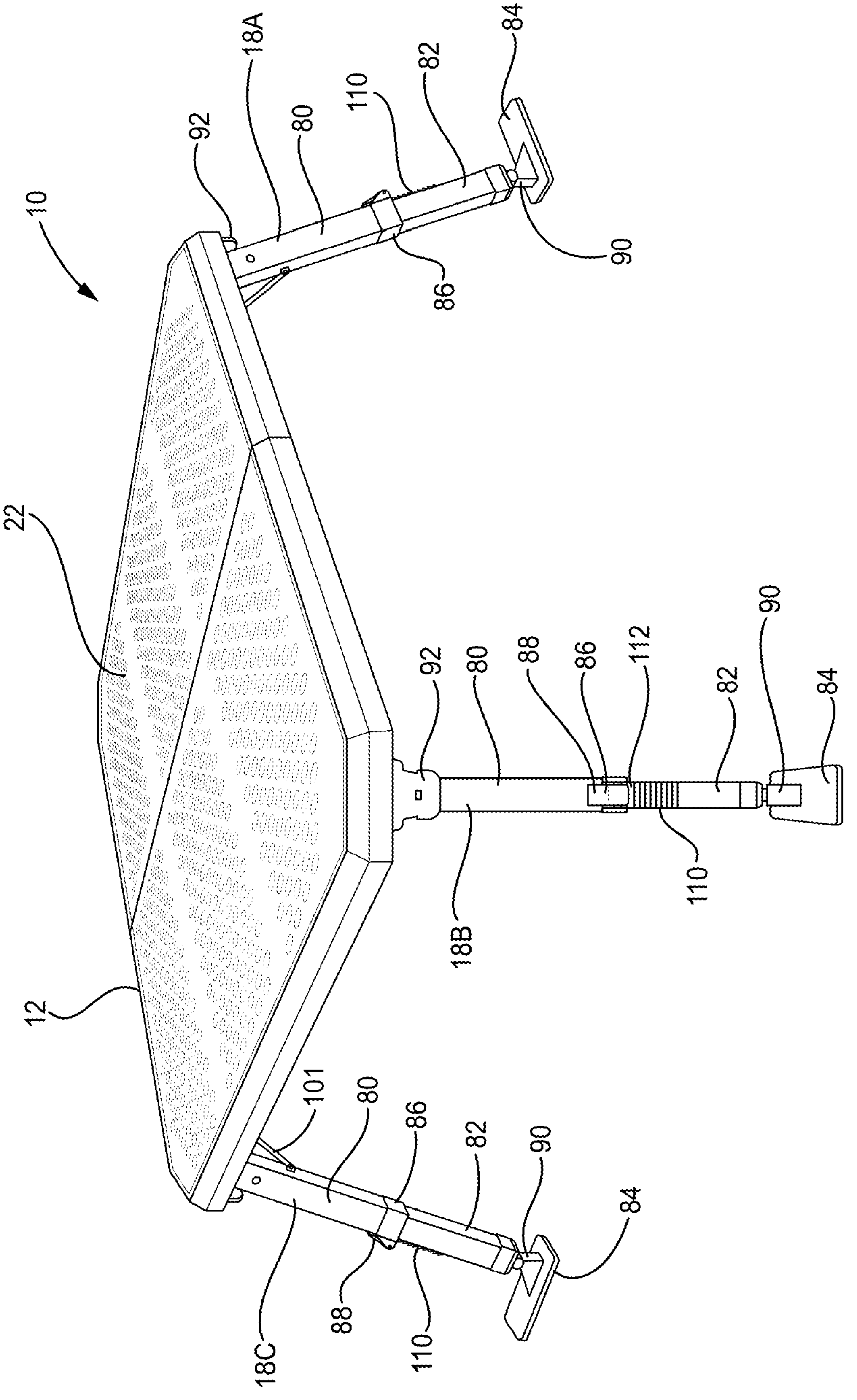
FIG. 17 is a perspective view of a portable hunting blind base with each support member in an unfolded position in accordance with one embodiment or aspect of the present disclosure.
Figure 18:
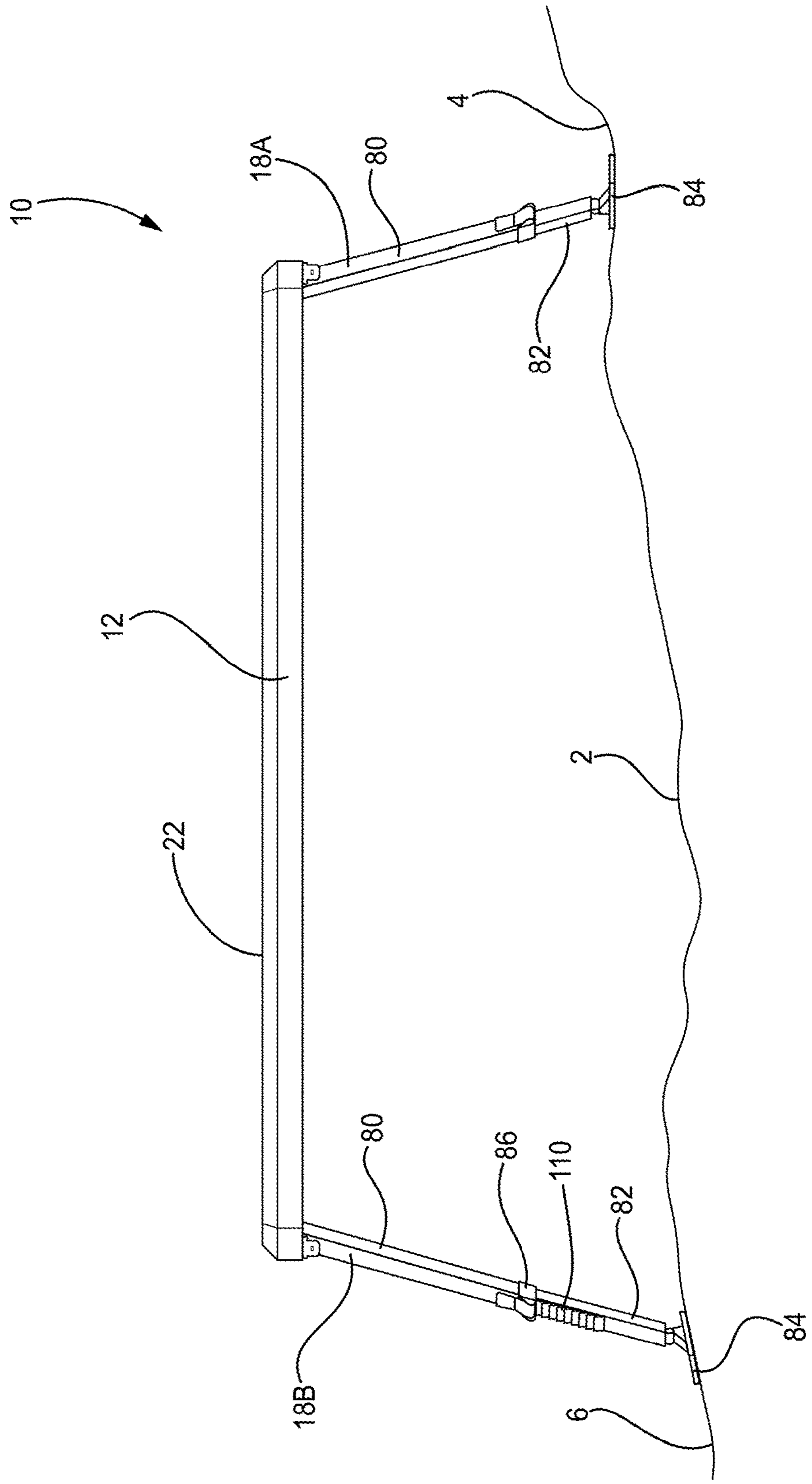
FIG. 18 is side view of the portable hunting blind base of FIG. 17 with each support member in an unfolded position on uneven ground in accordance with one embodiment or aspect of the present disclosure.

Referring to FIGS. 17 and 18, the portable hunting blind base 10 is shown in a supporting position. In the supporting position, the handles 16A, 16B and wheel arrangement 14 are removed from the base 12, the base 12 is unfolded, the adjustable supports 18A, 18B, 18C, 18D are unfolded, and then the adjustable supports 18A, 18B, 18C, 18D are extended from the base 12 in order to support the base 12 on the ground surface 2. The ground surface 2 may include even terrain 4 or uneven terrain 6, yet the adjustable supports 18A, 18B, 18C, 18D ensure that the portable hunting blind base 10 remains level and supported. This position and the process required to arrive at this position will be discussed in more detail below.

Figure 3:
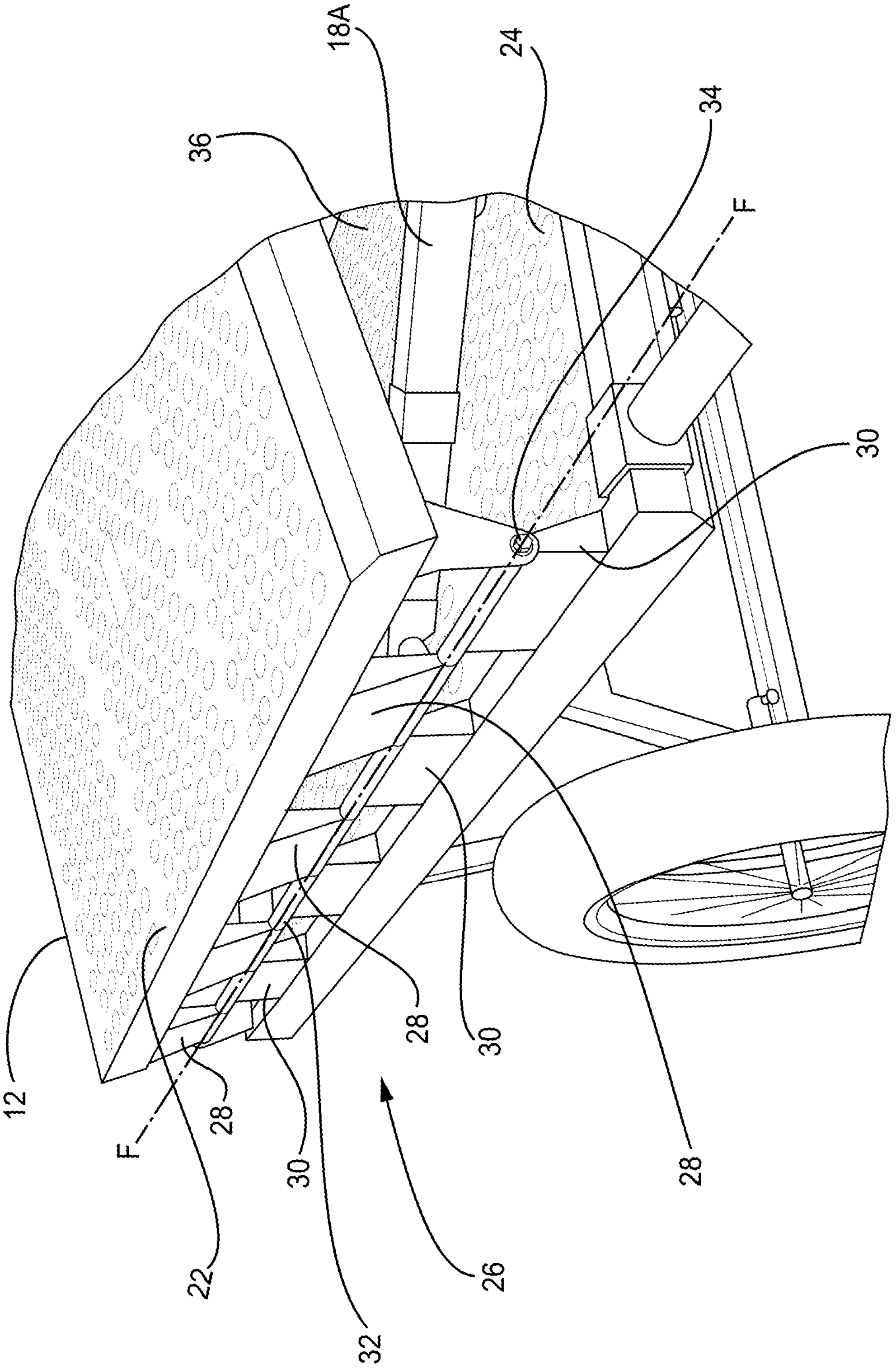
FIG. 3 is a perspective view of a partially folded base of the portable hunting blind base assembly in accordance with one embodiment or aspect of the present disclosure.
Figure 4:
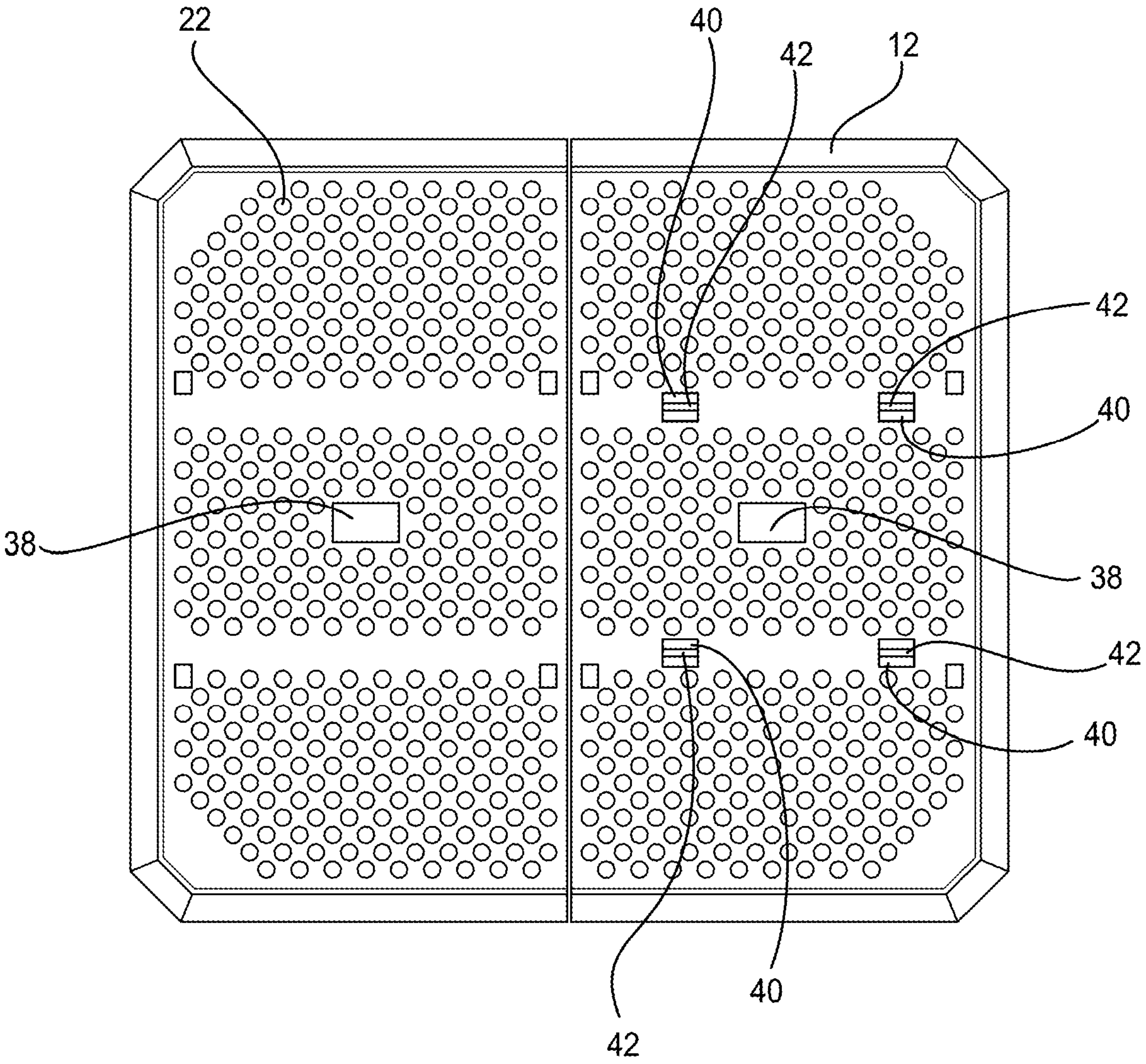
FIG. 4 is a top view of an unfolded base of the portable hunting blind base assembly in accordance with one embodiment or aspect of the present disclosure.
Figure 5:
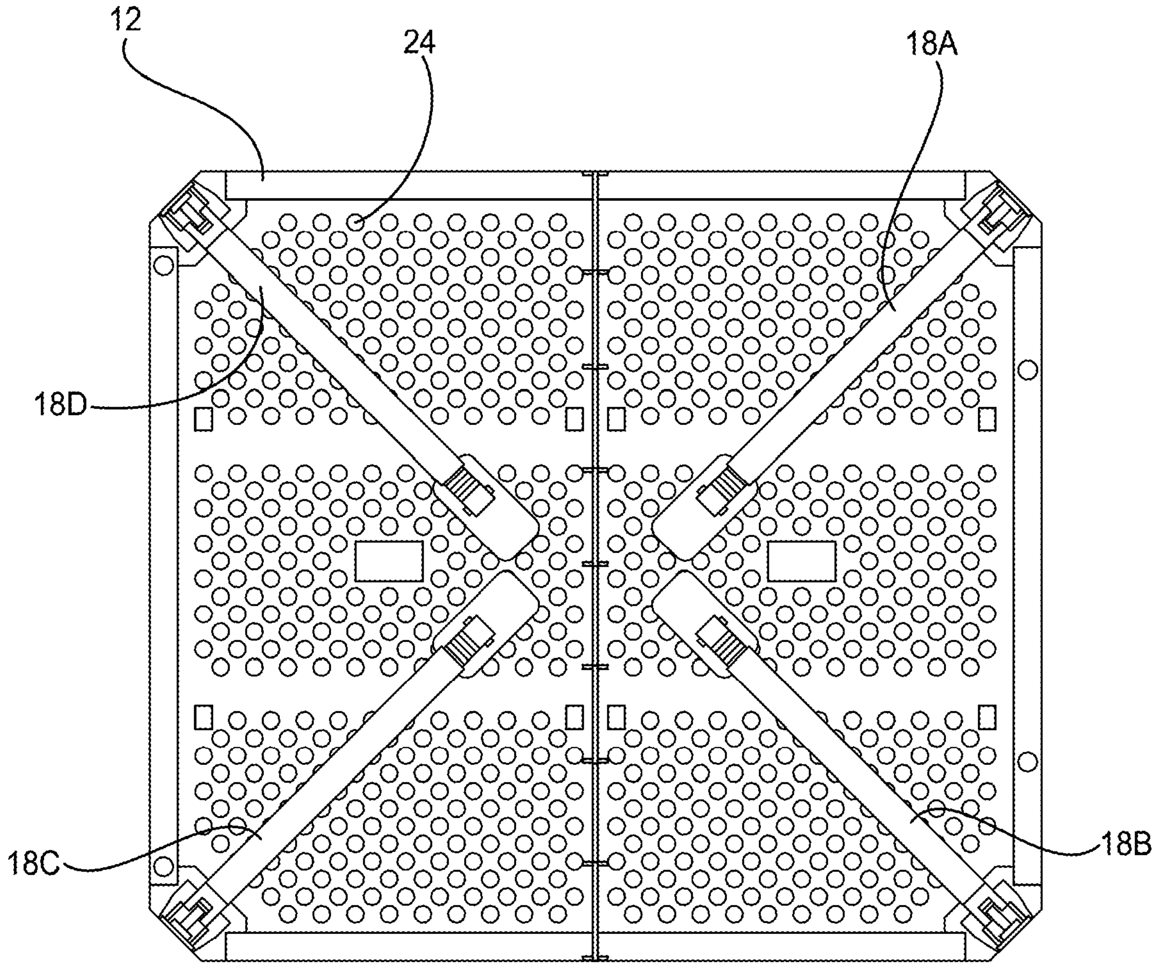
FIG. 5 is a bottom view of the unfolded base of FIG. 4.

With reference to FIGS. 3-5, the base 12 of the portable hunting blind base 10 is shown. The base 12 includes a first side 22 and a second side 24. In the folded position, the base 12 is folded in half with a first half 24A of the second side 24 facing a second half 24B of the second side 24, and a first half 22A of the first side 22 facing away from a second half 22B of the first side 22. In the unfolded position, the halves 22A, 22B, 24A, 24B of each side 22, 24 of the base 12 are adjacent to one another. The first side 22 supports a hunter (not shown) and any associated equipment (not shown) when the portable hunting blind base 10 is in the supporting position. The second side 24 includes the adjustable supports 18A, 18B, 18C, 18D extending from approximately the corners of the second side 24. As shown in FIG. 5, the adjustable supports 18A, 18B, 18C, 18D are shown as being folded under the now-unfolded second half 24. In the supporting position, the adjustable supports 18A, 18B, 18C, 18D will be unfolded and extended outwardly from the also unfolded second half 24.

To facilitate the folding of the base 12, the second side 24 includes a hinge arrangement 26 as shown in FIG. 3. The hinge arrangement 26 includes a first set of extensions 28 extending from the first half 24A and a second set of extensions 30 extending from the second half 24B. Both the first extensions 28 and the second extensions 30 share a hinge shaft 32 at an end of the extensions 28, 30 opposite the second side 24. The hinge shaft 32 receives a hinge pin 34 therethrough to facilitate the hinging action of the hinge arrangement 26. To ensure the base 12 can fold properly, the first extensions 28 and second extensions 30 alternate their position along a folding line F of the base 12. Because of this arrangement, both the first and second extensions 28, 30 fit next to each other along the folding line F. Because both the first and second extensions 28, 30 extend from their respective halves 24A, 24B of the second half 24, the folded base 12 defines an internal space 36 so that the adjustable supports 18A, 18B, 18C, 18D can fit in the portable hunting blind base 10 when in the transport position. As shown, the first and second extensions 28, 30 take a generally pyramidal shape and extend generally perpendicularly from their respective halves 24A, 24B of the second half 24. However, it is contemplated that other shapes and other extension angles may be used.

When in the unfolded and/or the support position, the first side 22 of the base 12 includes equipment holders or slots 38. The equipment holders 38 are shaped to receive a portion of a seat or other hunting equipment therein so as to mount that equipment to the portable hunting blind base 10. Examples of this can be seen in U.S. Pat. No. 10,645,920, which is incorporated by reference herein in its entirety. The first side 22 also includes engagement slots 40 with engagement bars 42. The engagement slots 40 and engagement bars 42 are located on either the first half 22A or the second half 22B and are arranged in a manner that permits engagement with the wheel arrangement 14 so that the portable hunting blind base 10 can be used in the transport position. The engagement between the engagement slots 40, engagement bars 42, and wheel arrangement 14 will be described in more detail below.

With reference to FIGS. 6-10, the wheel arrangement 14 is shown. The wheel arrangement 14 includes a first wheel support 50A and a second wheel support 50B. Both the first and second wheel supports 50A, 50B align with each other to receive and support the wheels 20A, 20B which will ultimately support the portable hunting blind base 10 so that it may be transported. The first and second wheel supports 50A, 50B both include a first support leg 52A1, 52B1 and a second support leg 52A2, 52B2. The first support legs 52A1, 52B1 are separated by a distance from the second support legs 52A2, 52B2, and both pairs of support legs 52A1, 52A2, 52B1, 52B2 extend parallel to one another. First connecting bars 54A, 54B extend across this distance between the support legs 52A1, 52B1, 52A2, 52B2 at a first end of the support legs 52A1, 52B1, 52A2, 52B2. Each wheel support 50A, 50B may also have a second connecting bar 56A, 56B extending between the first support legs 52A1, 52B1 and the second support legs 52A2, 52B2. The second connecting bars 56A, 56B are located a distance away from the first connecting bars 54A, 54B and the first ends of the wheel supports 50A, 50B. It is to be understood that additional connecting bars can be used as needed to support the wheel arrangement 14 as well.

Describing the wheel supports 50A, 50B in another manner, the first wheel support 50A includes the first support leg 52A1 and the second support leg 52A2, which are separated from each other by a distance. The first connecting bar 54A extends between the first support leg 52A1 and the second support leg 52A2 at the first end of the first and second support legs 52A1, 52A2. A second connecting bar 56A also extends between the first support leg 52A1 and the second support leg 52A2. The second wheel support 50B includes the first support leg 52B1 and the second support leg 52B2, which are also separated from each other by the same distance as the support legs 52A1, 52A2 of the first wheel support 50A. The first connecting bar 54B extends between the first support leg 52B1 and the second support leg 52B2 of the second wheel support 50B at the first end of the support legs 52B1, 52B2. The second connecting bar 56B also extends between the support legs 52B1, 52B2 of the second wheel support 50B.

Figure 6:
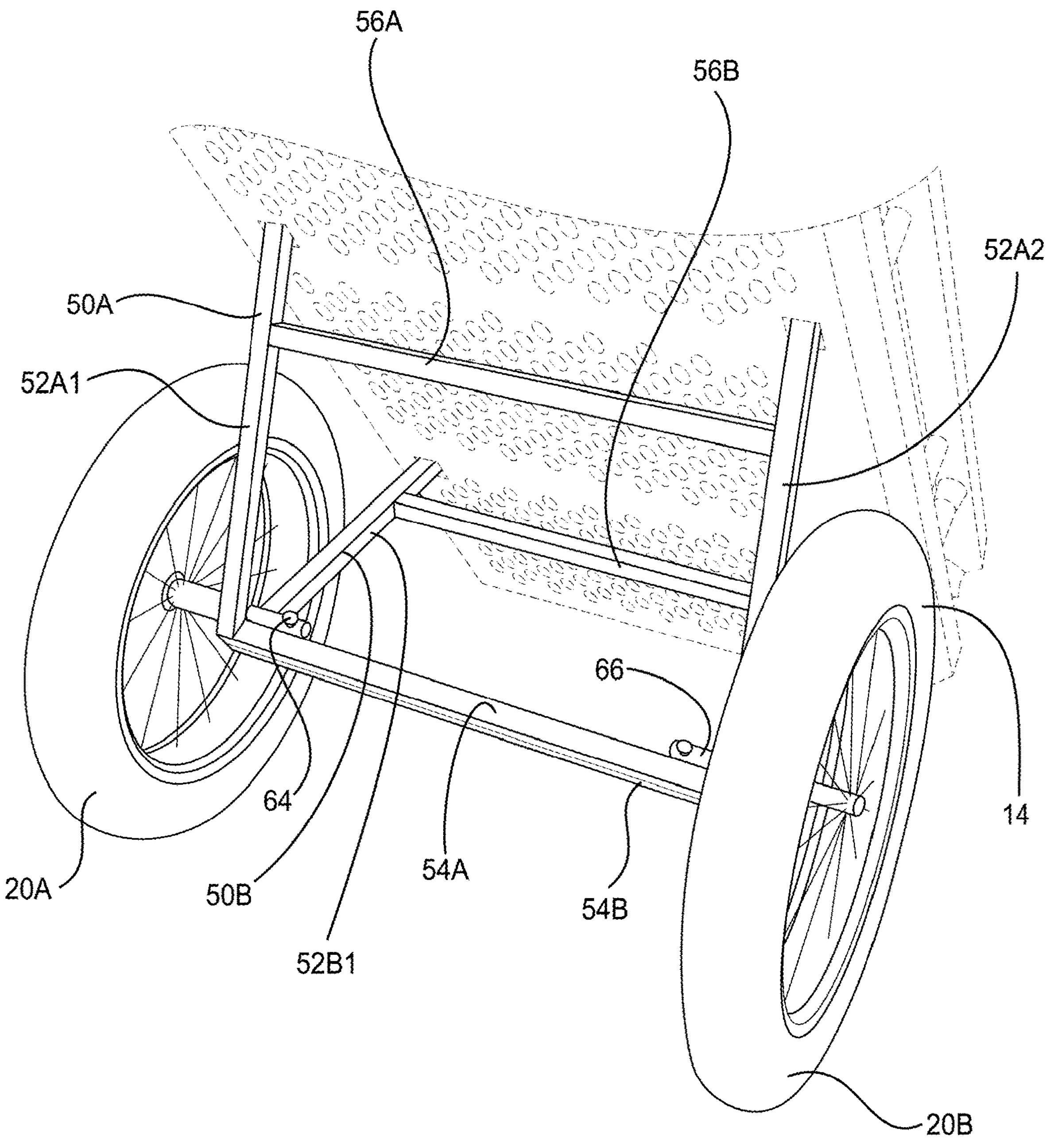
FIG. 6 is a perspective view of the wheel arrangement attached to the base of the portable hunting blind base assembly of FIG. 1 according to one embodiment or aspect of the present disclosure.
Figure 7:
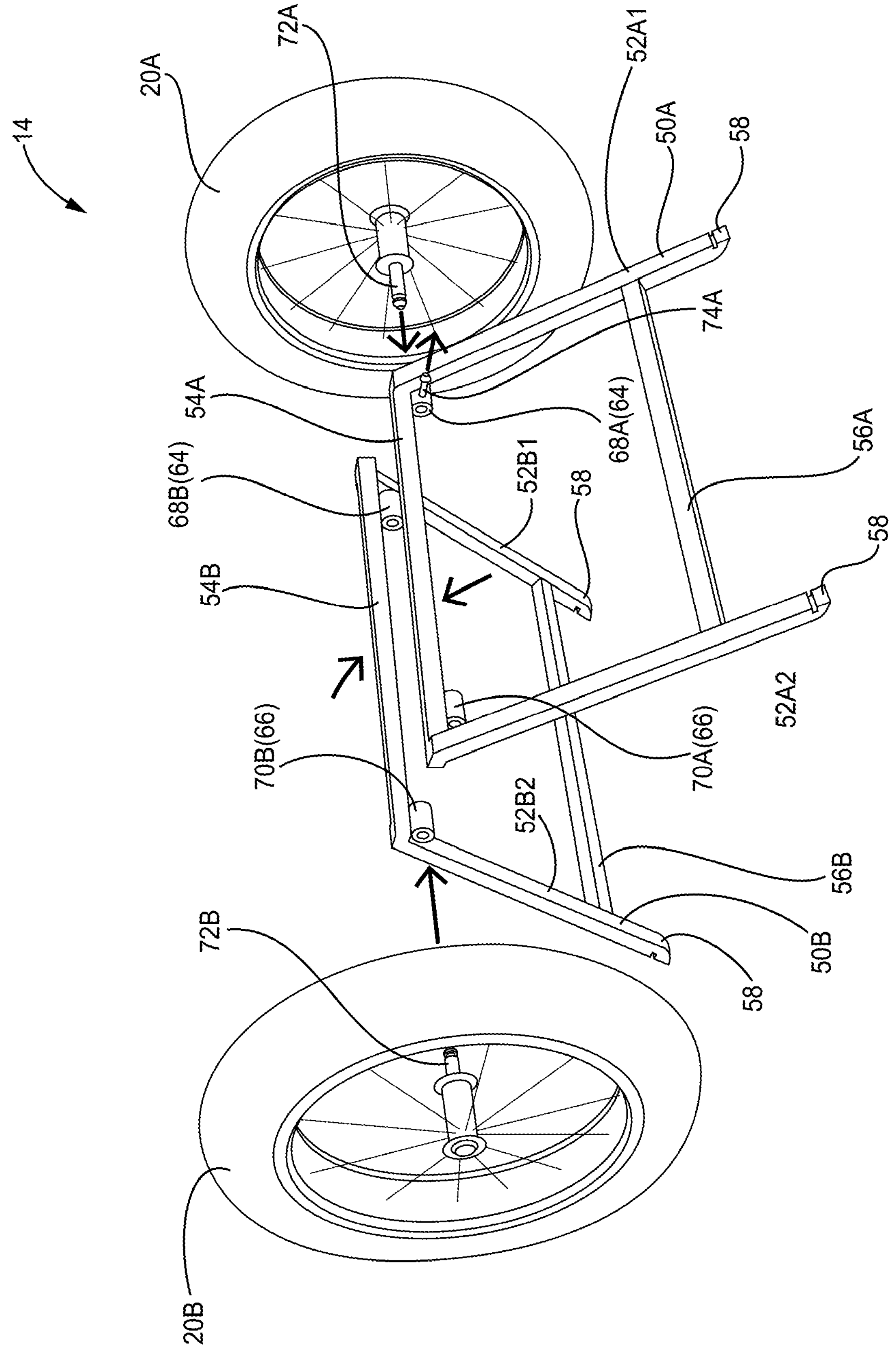
FIG. 7 is an exploded view of the wheel arrangement of FIG. 6.
Figure 10:
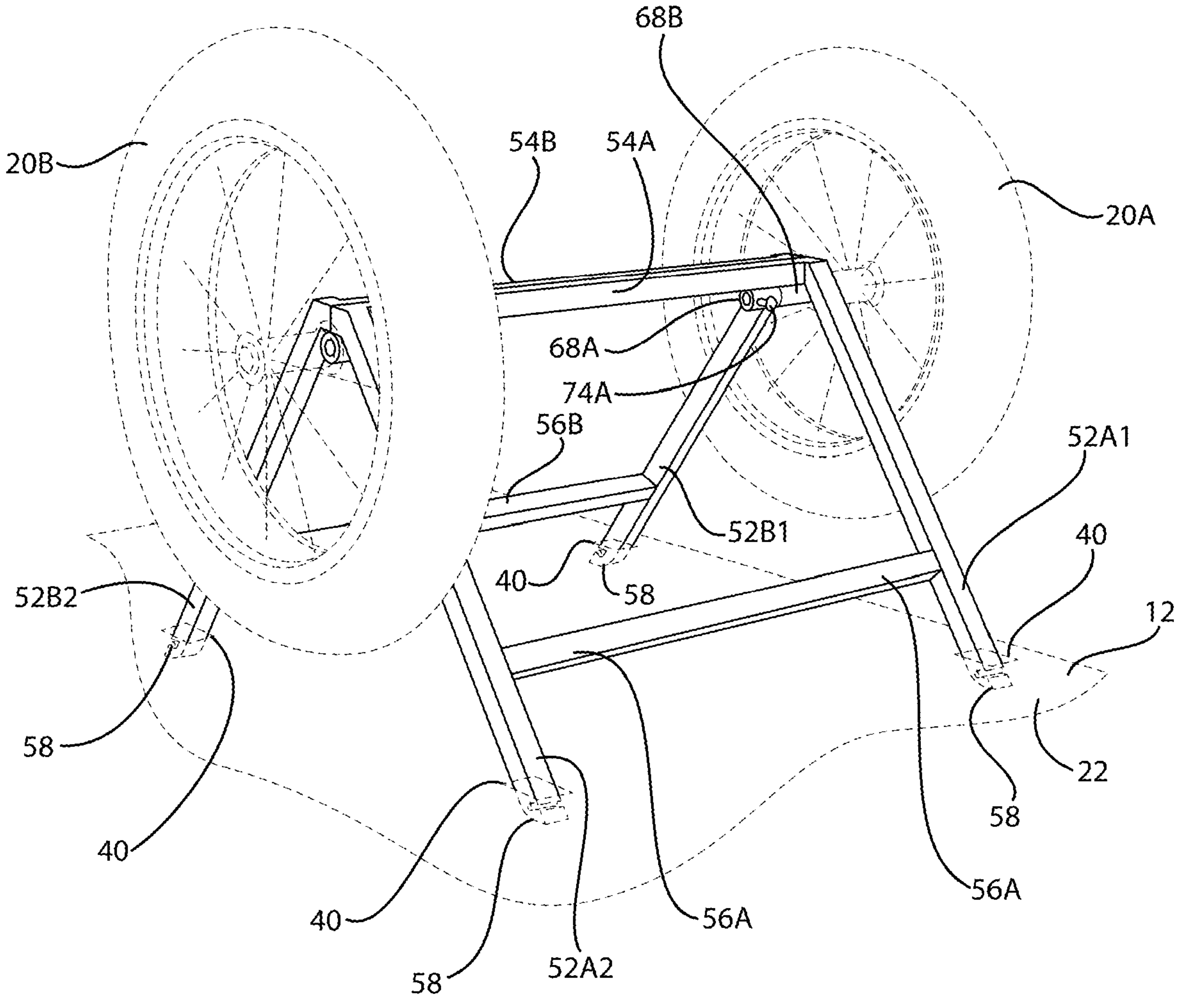
FIG. 10 is a partially transparent perspective view of the wheel arrangement connected to a base of the portable hunting blind base assembly in accordance with one embodiment or aspect of the present disclosure.
Figure 11:
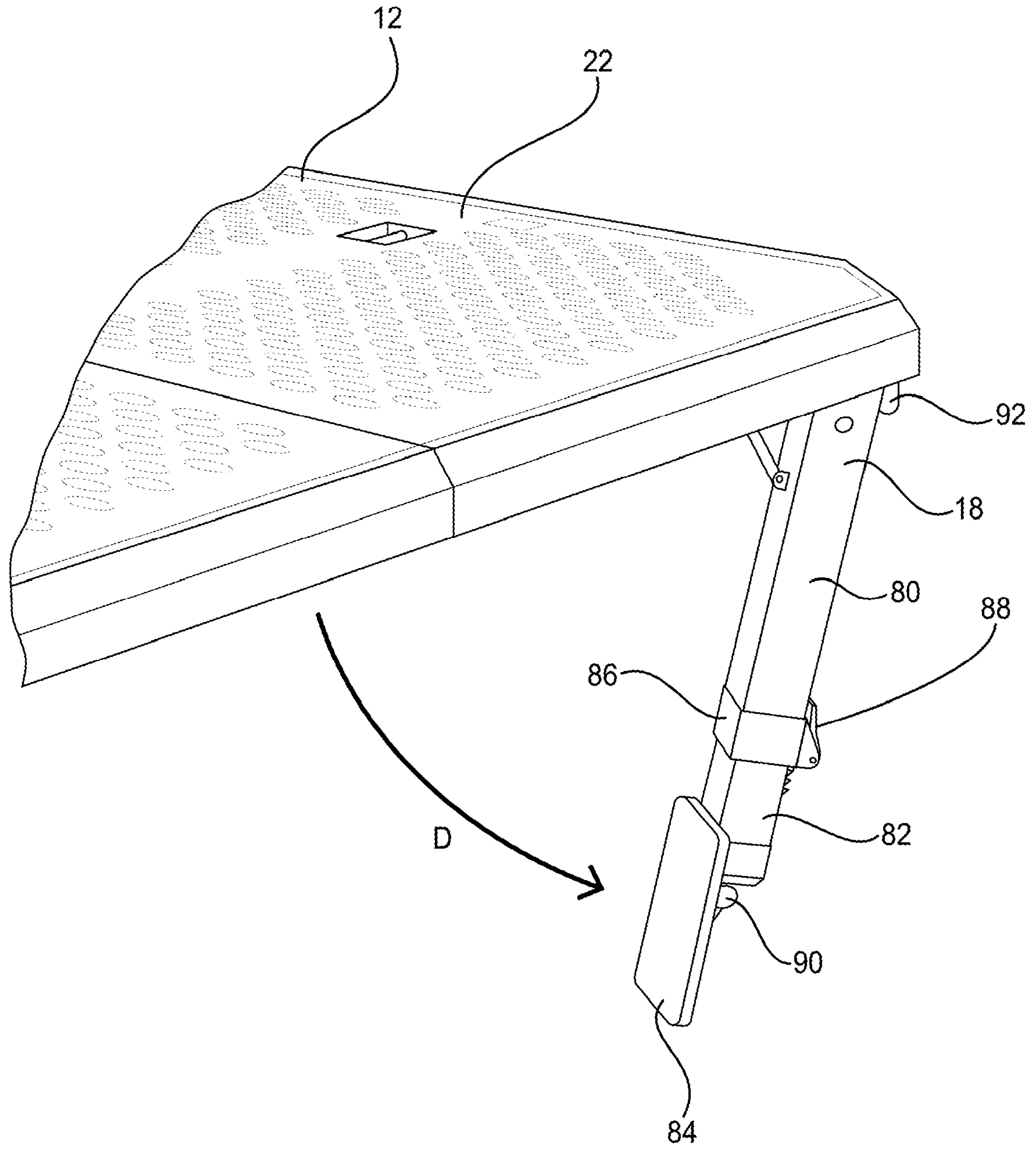
FIG. 11 is a perspective view of a partially unfolded support member of the portable hunting blind base assembly in accordance with one embodiment or aspect of the present disclosure.
Figure 12:
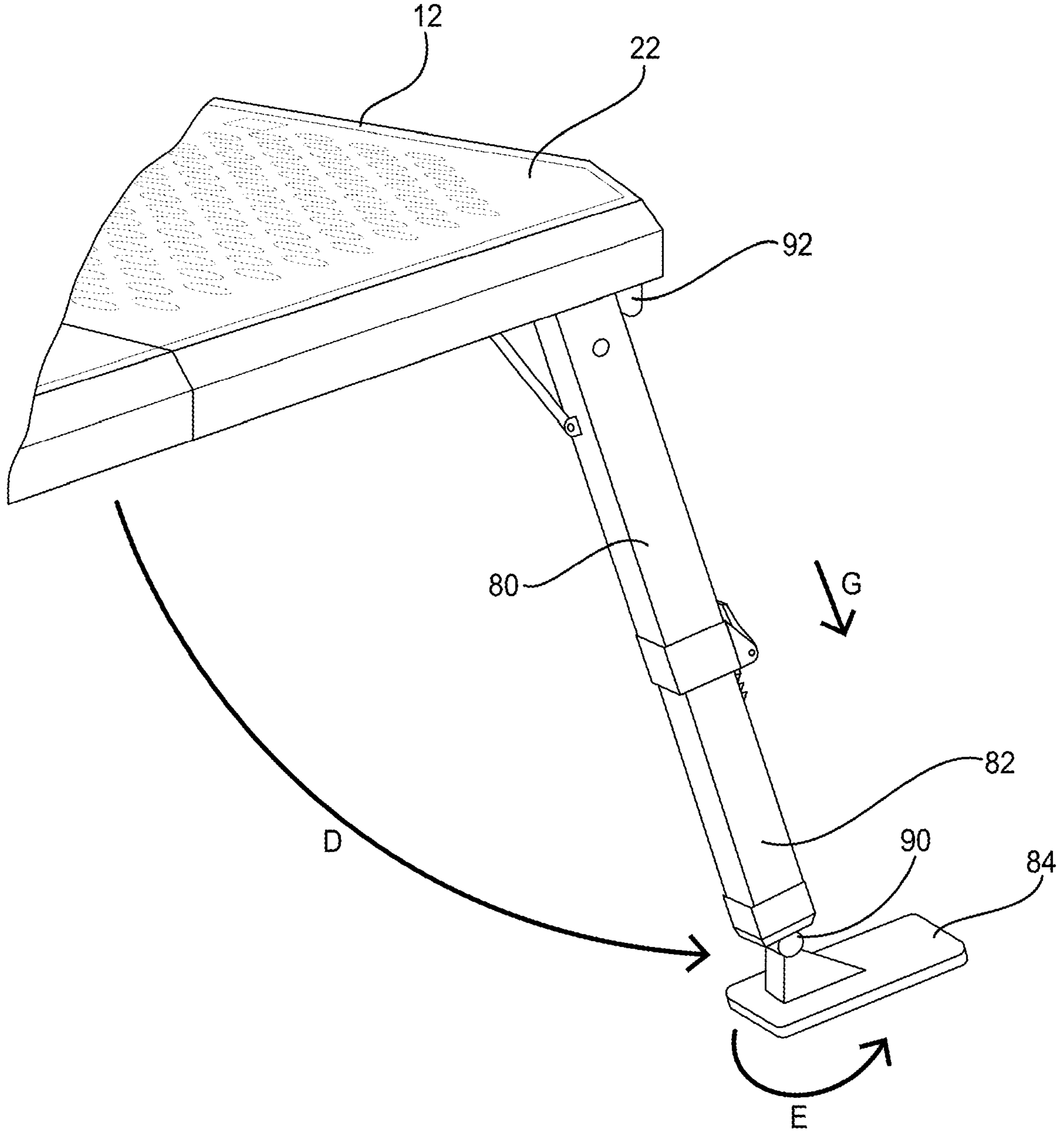
FIG. 12 is a perspective view of an unfolded support member of the portable hunting blind base assembly of FIG. 11.
Figure 13:
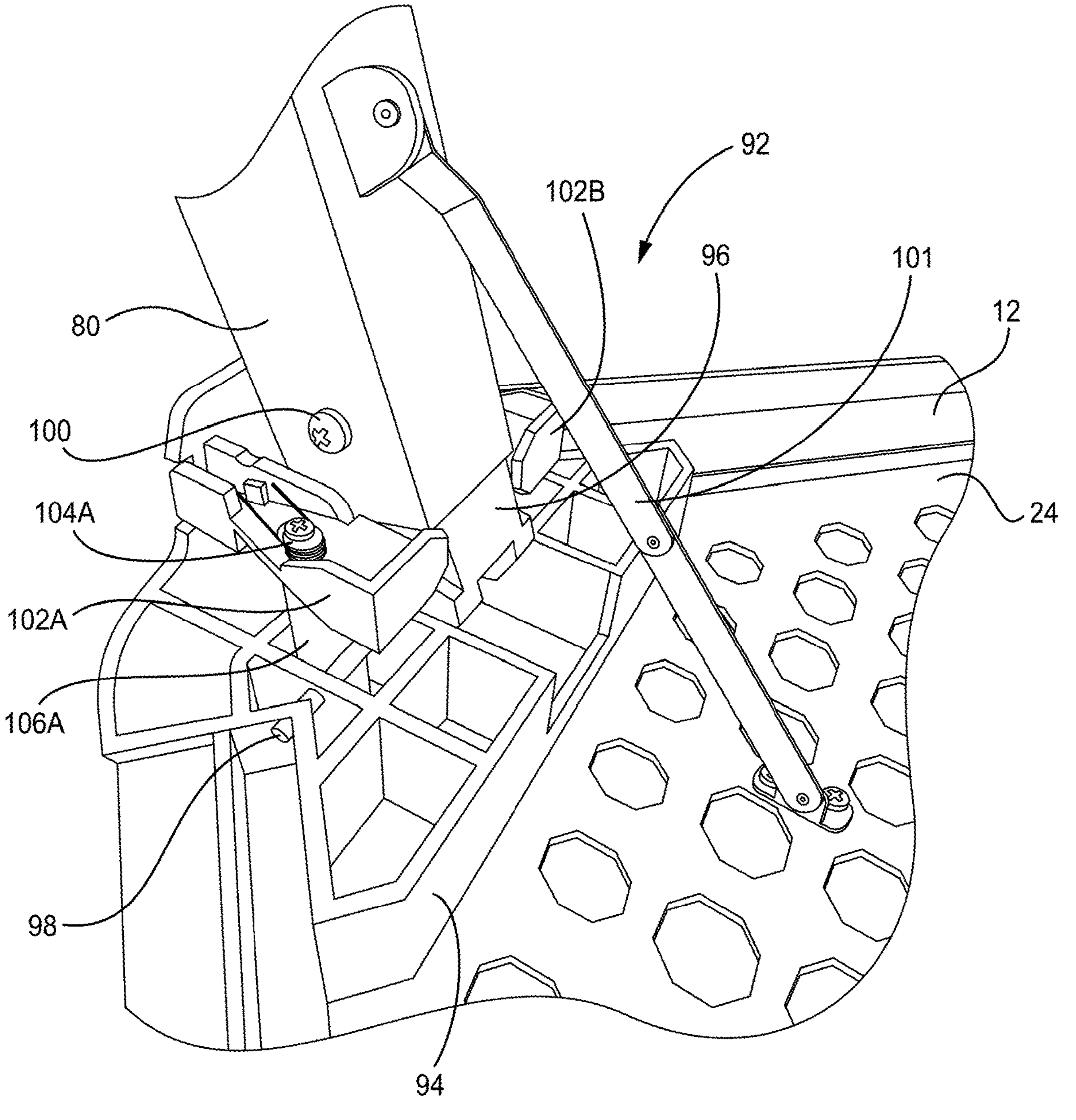
FIG. 13 is a perspective view of a bracket of a support member of a portable hunting blind base assembly in accordance with one embodiment or aspect of the present disclosure.
Figure 14:
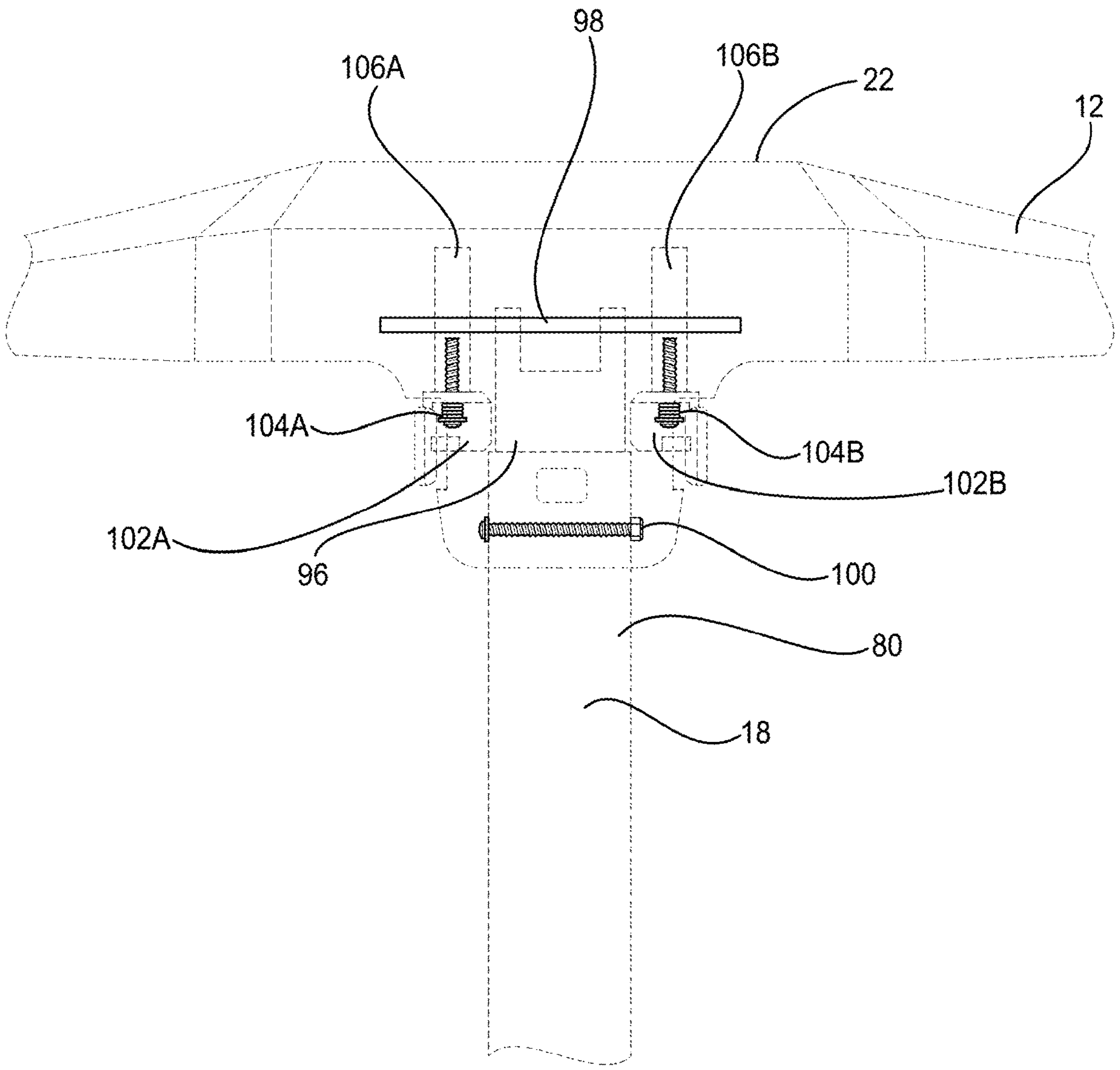
FIG. 14 is a partially transparent front view of the bracket of FIG. 13.
Figure 15:
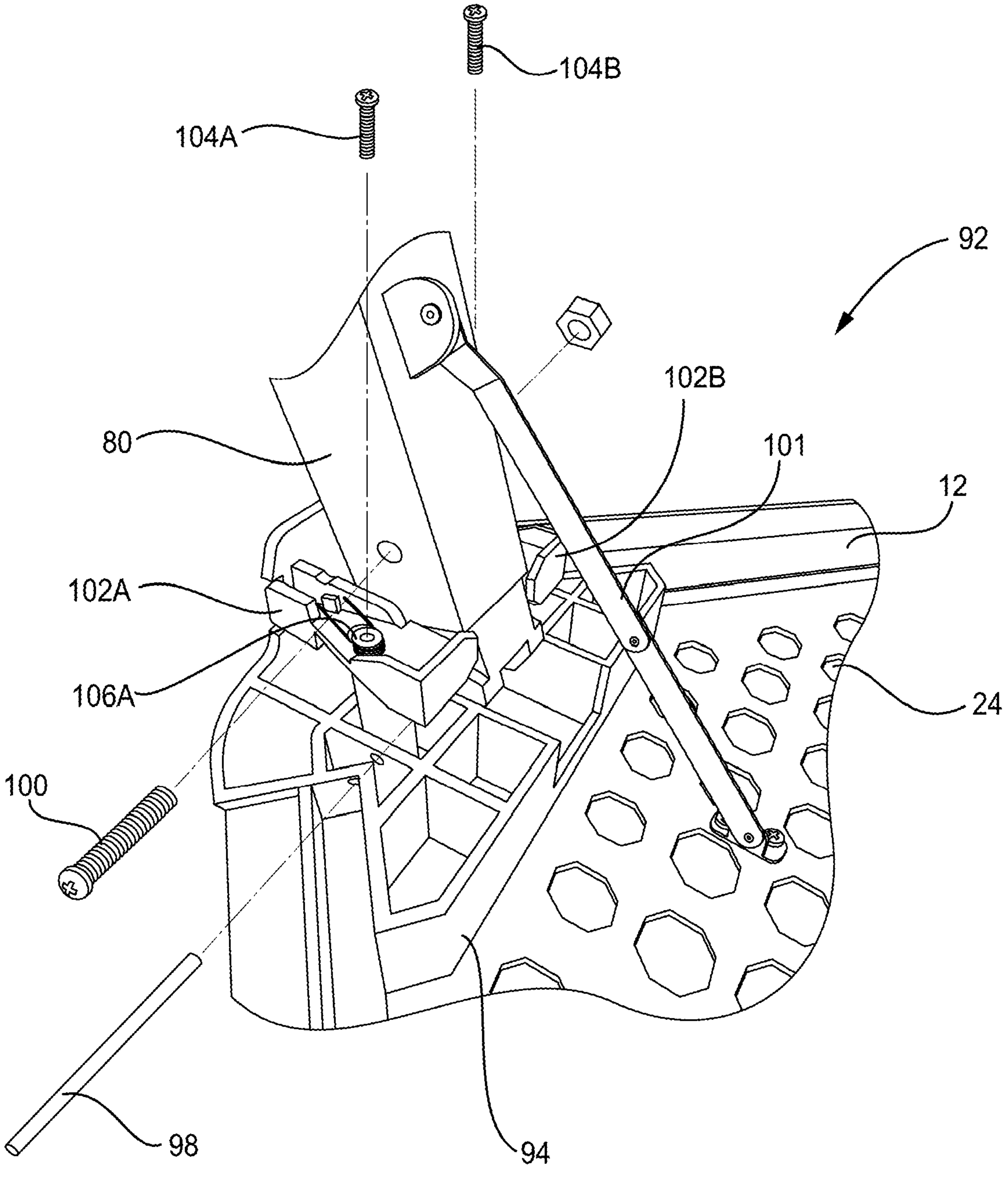
FIG. 15 is a partially exploded view of the bracket of FIG. 13.
Figure 16:
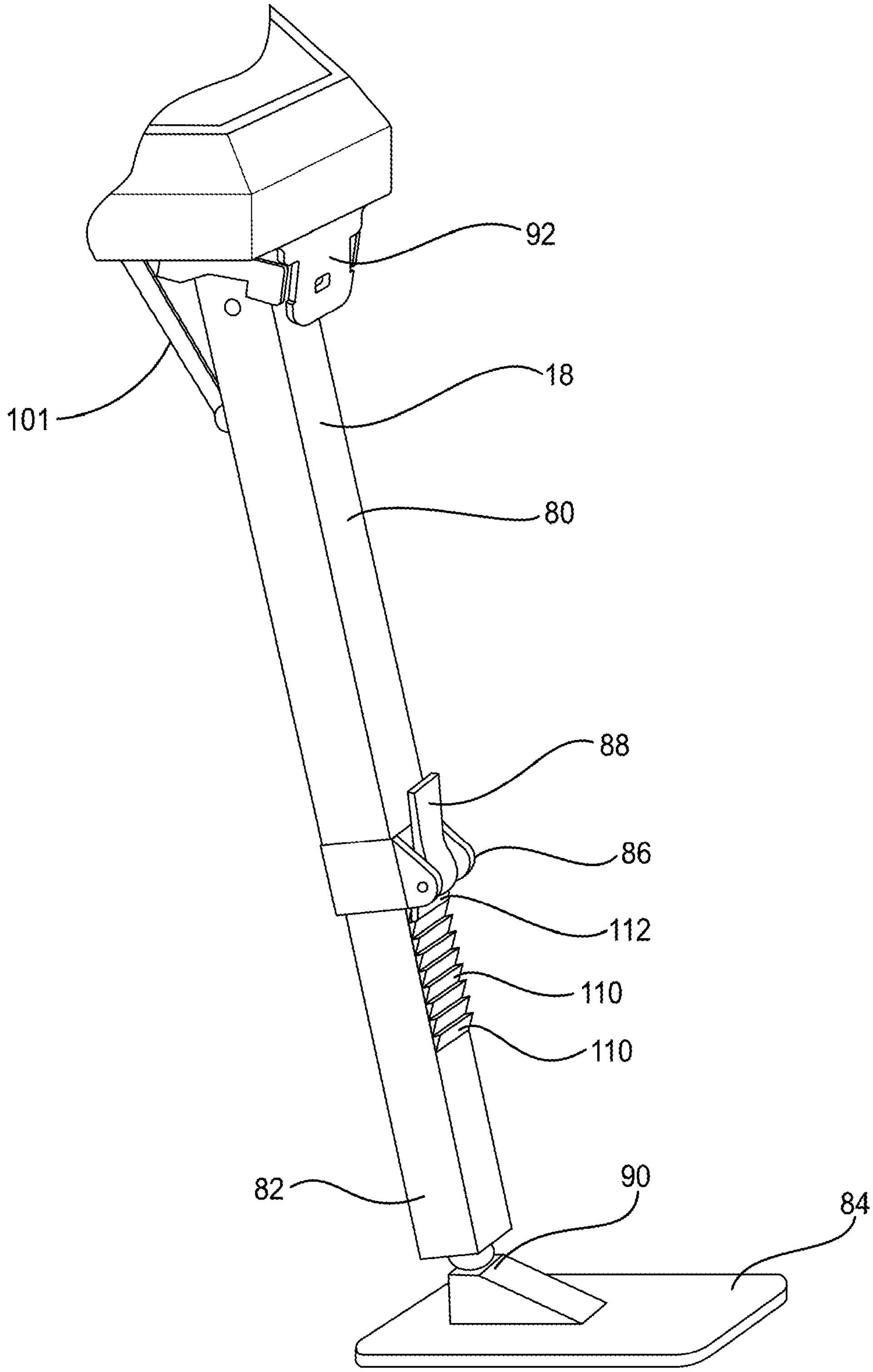
FIG. 16 is a perspective view of the unfolded support member of FIG. 12.

The support legs 52A1, 52A2 of the first wheel support 50A extend parallel to each other, and the support legs 52B1, 53B2 of the second wheel support 50B also extend parallel to each other. The wheel supports 50A, 50B are generally arranged to extend away from the base 12 at an angle so that the first connecting bar 54A of the first wheel support 50A and the first connecting bar 54B of the second wheel support 50B contact each other when the wheel supports 50A, 50B are engaged with the base 12 as shown in FIGS. 2, 6, and 10.

Figure 8A:
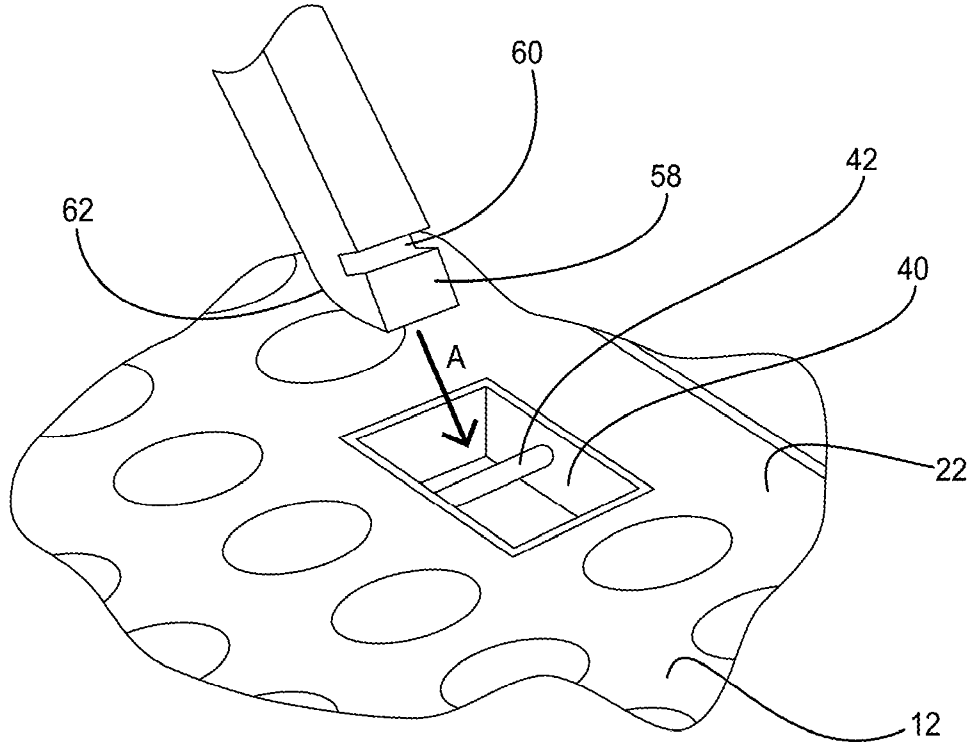
FIG. 8A is a perspective view showing the attachment of the wheel arrangement of FIG. 3 to a base of the portable hunting blind base assembly in accordance with one embodiment or aspect of the present disclosure.
Figure 8B:
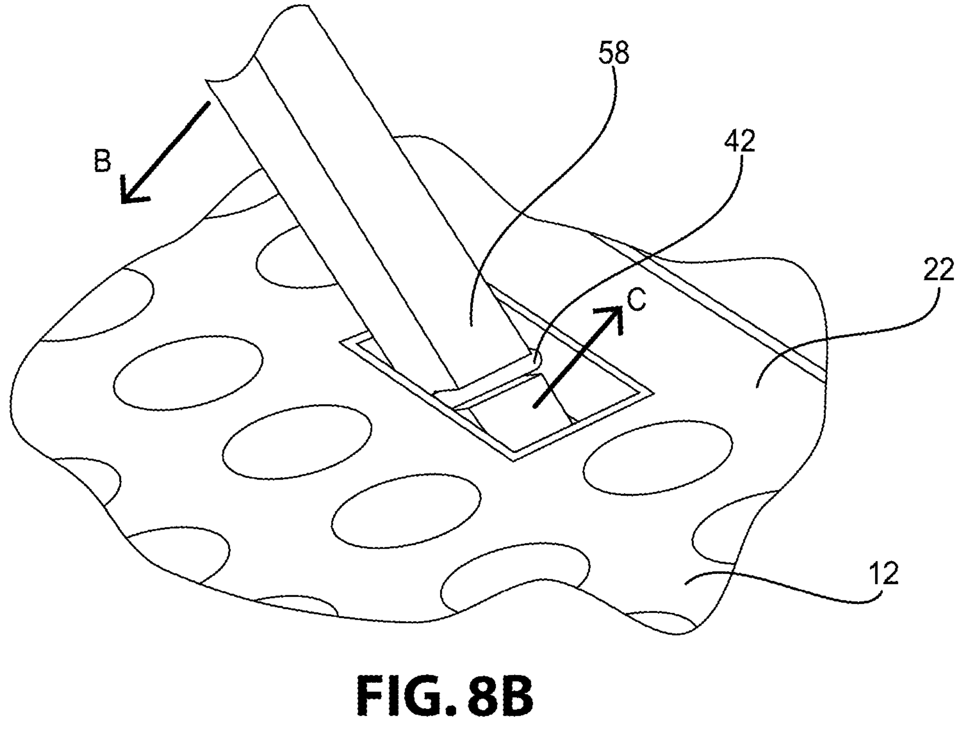
FIG. 8B is another perspective view showing the attachment of the wheel arrangement of FIG. 3 to the base of the portable hunting blind base assembly.

At a second end of the support legs 52A1, 52A2, 52B1, 52B2, opposite the first end, each support leg 52A1, 52A2, 52B1, 52B2 includes a hook 58. The hooks 58 are used to engage the engagement slots 40 and engagement bars 42 on one half of the first side 22 of the base 12. The hooks 58 include a slot 60 and a rounded outer surface 62, which are used to mount the wheel supports 50A, 50B to half 22A of the base 12. An example of one hook 58 of a support leg 52A1 being applied to one engagement slot 40 and engagement bar 42 is shown in FIGS. 8A and 8B. In FIGS. 8A and 8B, the hook 58 is applied to the engagement slot 40 and engagement bar 42 from above, in a generally downward direction. When each hook 58 is engaged with each corresponding engagement slot 40 and engagement bar 42, the wheel supports 50A, 50B will be located on top of the folded base 12, as shown in FIG. 10, which requires the portable hunting blind base 10 to be flipped over (a 180-degree rotation) in order to properly function in the transport position.

During the engagement process, the end of the support leg 52A1 with the hook 58 is slid into the engagement slot 40, as shown by arrow A. By applying a force in the direction of arrow B, which can be done by letting the support leg 52A1 fall in that direction due to the angled nature of the wheel supports 50A, 50B, the hook 58 is moved in the direction of arrow C and the slot 60 receives the engagement bar 42 therein. This locks the support leg 52A1 in place within the engagement slots 40. The rounded surface 62 has a radius large enough so that upon the wheel supports 50A, 50B being connected to each other (described below) and the portable hunting blind base 10 being flipped over, the rounded surface 62 ensures that the slot 60 remains engaged with the engagement bar 42 and the hook 58 and rounded surface 62 remain in the engagement slot 40. In other words, the hook 58 is shaped such that it can only be removed from the engagement slot 40 upon the portable hunting blind base 10 being flipped over and the wheel supports 50A, 50B being disconnected from one another in manner opposite that just previously described. To remove the hook 58 from the engagement slot 40, a user must rotate the hook 58 within the engagement slot 40 in a manner that is not possible when the wheel supports 50A, 50B are connected to each other.

Referring back to the first end of the wheel supports 50A, 50B, the first connecting bars 54A, 54B have a first wheel receiving shaft 64 and a second wheel receiving shaft 66 extending therefrom. As viewed in FIGS. 7 and 10, the wheel receiving shafts 64, 66 extend generally downwardly from their respective connecting bars 54A, 54B. As viewed in FIGS. 1, 2, 6, and 9 and as used in the transport position, the wheel receiving shafts 64, 66 extend generally upwardly from their respective connecting bars 54A, 54B. The first wheel receiving shaft 64 and the second wheel receiving shaft 66 are further defined by portions extending from both the first connecting bar 54A of the first wheel support 50A and the first connecting bar 54B of the second wheel support 50B. The first connecting bar 54A of the first wheel support 50A includes a first wheel receiving shaft portion 68A located proximate the first support leg 52A1 and a second wheel receiving shaft portion 70A located proximate the second support leg 52A2. The first connecting bar 54B of the second wheel support 50B includes a first wheel receiving shaft portion 68B located proximate the first support leg 52B1 and a second wheel receiving shaft portion 70B located proximate the second support leg 52B2.

Because the first connecting bars 54A, 54B contact each other when the wheel support arrangement 14 is assembled with the base 12, the wheel receiving shafts 64, 66 are formed by aligning the receiving shaft portions 68A, 68B, 70A, 70B in a manner consistent with the first connecting bars 54A, 54B contacting each other when fully assembled. In particular, the first wheel receiving shaft portion of the first connecting bar 68A aligns with the first wheel receiving shaft portion of the second connecting bar 68B to create the first wheel receiving shaft 64. The second wheel receiving shaft portion of the first connecting bar 70A aligns with the second wheel receiving shaft portion of the second connecting bar 70B to create the second wheel receiving shaft 66.

Figure 9:
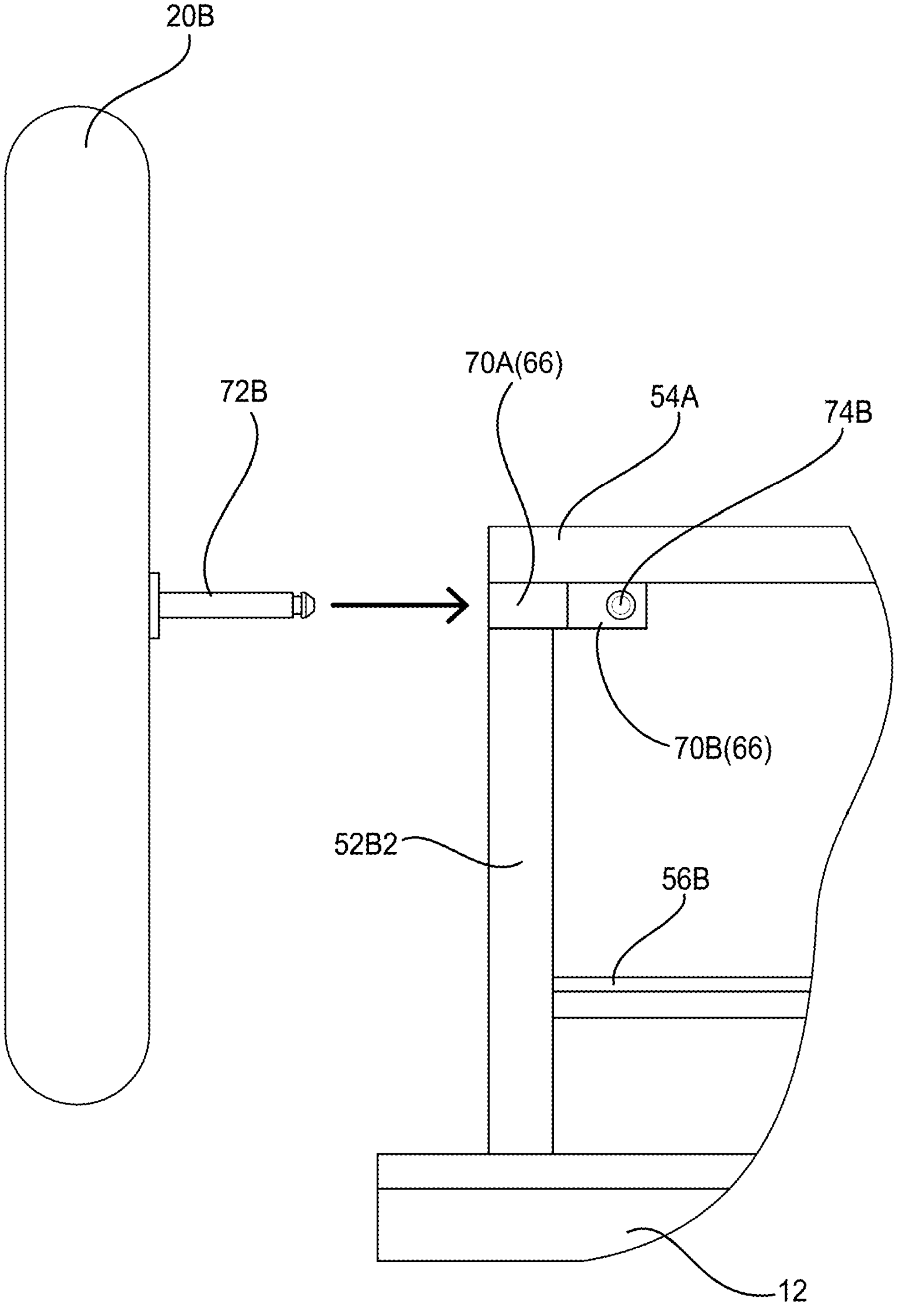
FIG. 9 is a side view showing the attachment of a wheel to the wheel arrangement of FIG. 6, with some elements omitted for clarity, in accordance with one embodiment or aspect of the present disclosure.

The wheel receiving shafts 64, 66 receive at least a portion of a wheel axle shaft 72A, 72B of one of the wheels 20A, 20B therein. One of the wheel receiving shaft portions 68A, 70A of the first connecting bar 54A of the first wheel support 50A includes a locking pull tab 74A. One of the wheel receiving shaft portions 68B, 70B of the first connecting bar 54B of the second wheel support 50B also includes a locking pull tab 74B. Both of the locking pull tabs 74A, 74B must be located on different wheel receiving shafts 64, 66. Both locking pull tabs 74A, 74B can be pulled away from their respective wheel receiving shaft 64, 66 to allow the wheel shafts 72A, 72B to be fully received by their respective wheel receiving shafts 64, 66. Then the locking pull tabs 74A, 74B can be released in order to lock the wheel shafts 72A, 72B within their respective wheel receiving shafts 64, 66. A portion of the locking pull tabs 74A, 74B located within the wheel receiving shafts 64, 66 can contact or fit around a portion of the circumference of the wheel shafts 72A, 72B in order to retain the wheel shafts 72A, 72B within their respective wheel receiving shafts 64, 66. An example of a wheel 20B and wheel shaft 72B being placed into a wheel receiving shaft 66 is shown in FIG. 9. It is to be understood that some elements of wheel support 50A are omitted for clarity.

Although locking pull tabs 74A, 74B are shown, other locking methods known to those having ordinary skill in the art can also be used. One of these locking methods can use a cotter pin (not shown) that is received through corresponding holes (not shown) in the wheel receiving shafts 64, 66 and the wheel shafts 72A, 72B. Another method can use a single long axle (not shown) that extends through both wheel receiving shafts (64, 66) across the length of the connecting bars 54A, 54B. Portions of the long axle can extend outward from the wheel receiving shafts 64, 66 so that the wheels 20A, 20B can then be secured to the long axle at opposing ends. By securing both wheels 20A, 20B to the ends of the long axle, the wheels 20A, 20B and long axle are held in place relative to the wheel arrangement 14 which helps to secure the wheel arrangement 14 in place for use. By locking the wheel shafts 72A, 74B within wheel receiving shafts 64, 66 that include elements from both the wheel supports 50A, 50B, both wheel supports 50A, 50B are locked into place together at the first end.

Combining the interaction of the locking pull tabs 74A, 74B and the wheel shafts 72A, 72B at the first end of the wheel supports 50A, 50B with the locking action of the hook 58 and engagement slots 40 at the second end of the wheel supports 50A, 50B allows the entire wheel arrangement to become affixed to the base 12, flipped 180 degrees, and operated in the transport position. By performing the opposite actions as have been described herein, one will understand how to disengage the wheel arrangement 14 from the base 12 and rearrange the portable hunting blind base 10 so that it is in the support position. This process will now be described.

As discussed above and shown in FIGS. 8A and 8B, the hook 58 at the end of each support leg 52A1 is locked about an engagement bar 42 to ensure that each wheel support 50A, 50B is in place with respect to the base 12. While this engagement has only been described in use with the base 12 of the portable hunting blind base 10, it is to be appreciated that the wheel arrangement 14 can be used in other applications in a similar manner as described herein. For example carts and storage containers may have engagement bars 42 within engagement slots 40 that are dimensioned to engage with the wheel arrangement 14 in order to wheel the cart or storage container from one location to another. The wheel arrangement 14 of the present application can be useful when an item needs to be moved to a location where the wheels 20A, 20B or wheel arrangement 14 more generally need to be detached. An example of this are stackable storage containers. Multiple storage containers may need to be moved into a storage location and then stacked upon one another to conserve space. The wheel arrangement 14 can be attached to these storage containers to move them and then detached to facilitate storage. Another use for the wheel arrangement 14 can be in connection with support platforms that are used as a stage. Stages for concerts are typically formed by having multiple, identical pieces assembled together. By outfitting the individual pieces that are assembled together to form the stage with the wheel arrangement 14 of this application, different stage segments can be easily transported from a storage location to the staging location. Other applications of the wheel arrangement 14 described herein may become apparent to those having skill in the art.

With reference to FIGS. 11-17, the operation of the adjustable supports 18A, 18B, 18C, 18D will now be described. Although only one adjustable support (generically labeled as 18) is shown, each of the four adjustable supports 18A, 18B, 18C, 18D operate in the same manner. Each adjustable support includes a base portion 80, a telescopic extension 82 adjustably extending from the base portion 80, and a foot 84 operatively connected to the telescopic extension 82. As will be described in more detail below, the telescopic extension 82 fits within and extends from the base portion 80 during use of the adjustable support 18. When the base 12 is in the folded position, the telescoping extensions 82 may be completely retracted within the base portion 80 so that each adjustable support 18A, 18B, 18C, 18D can fit within the internal space 36 defined within the folded base 12. An adjustment control piece 86 having an adjustment flap 88 is located on an end of the adjustable support 18 opposing the base 12. The adjustment flap 88 is rotatably movable relative to the adjustment control piece 86 in order to permit or stop the telescoping of the telescoping extension 82. The foot 84 is rotatably connected via a foot hinge 90 to the telescoping extension 82. To unfold the adjustable support 18 from the second side 24 of the base 12, the adjustable support is pivoted in direction D. The foot 84 is then rotated in direction E, and the telescoping extension 82 is then drawn out, depending on the terrain, in direction G.

Pivoting of the adjustable support 18 in direction D is made possible by a bracket 92. The bracket 92 is located on the second side 24 of the base 12 in each corner of the base 12 where each of the four adjustable supports 18A, 18B, 18C, 18D are located. The bracket 92 includes a base 94 that is connected or adjacent to the second side 24 of the base 12. The bracket 92 also includes a bracket leg 96 that is connected to and extends from the base 94 in the support position. Like the telescoping extension 82, the bracket leg 96 is received within the base portion 80. The bracket leg 96 is received within the base portion 80 at an end opposing the telescoping extension 82. A bracket hinge pin 98 extends through the bracket leg 96 and the bracket base 94 on both sides of the bracket leg 96 in order to permit rotation of the bracket leg 96 and thus the pivoting of the adjustable support 18. A connecting screw 100 serves to connect the base portion of the adjustable support 18 to the bracket leg 96 so that rotation of the bracket leg 96 within the bracket 92 will result in rotation of the adjustable support 18.

The bracket 92 also includes side supports 102A, 102B that support and retain both the bracket leg 96 and the base portion 80 within the bracket 92. The side supports 102A, 102B help maintain the proper rotation of the bracket leg 96 and base portion 80 within the bracket 92 should one of the bracket hinge pin 98 or connecting screw 100 loosen or otherwise become compromised. A connecting beam 101 connected to the base portion 80 and second side 24 also helps support proper alignment of the base portion 80 as it unfolds from under the second side 24. Side support screws 104A, 104B help connect the side supports 102A, 102B to the bracket base 94. The side support screws 104A, 104B are received within corresponding bracket threads 106A, 106B that extend from the bracket base 94 and toward the side supports 102A, 102B. While not shown in the drawings, each pin or screw discussed above has corresponding apertures extending through the elements discussed above so that the pin and/or screws can be properly received by and function within their associated elements.

Figure 19:
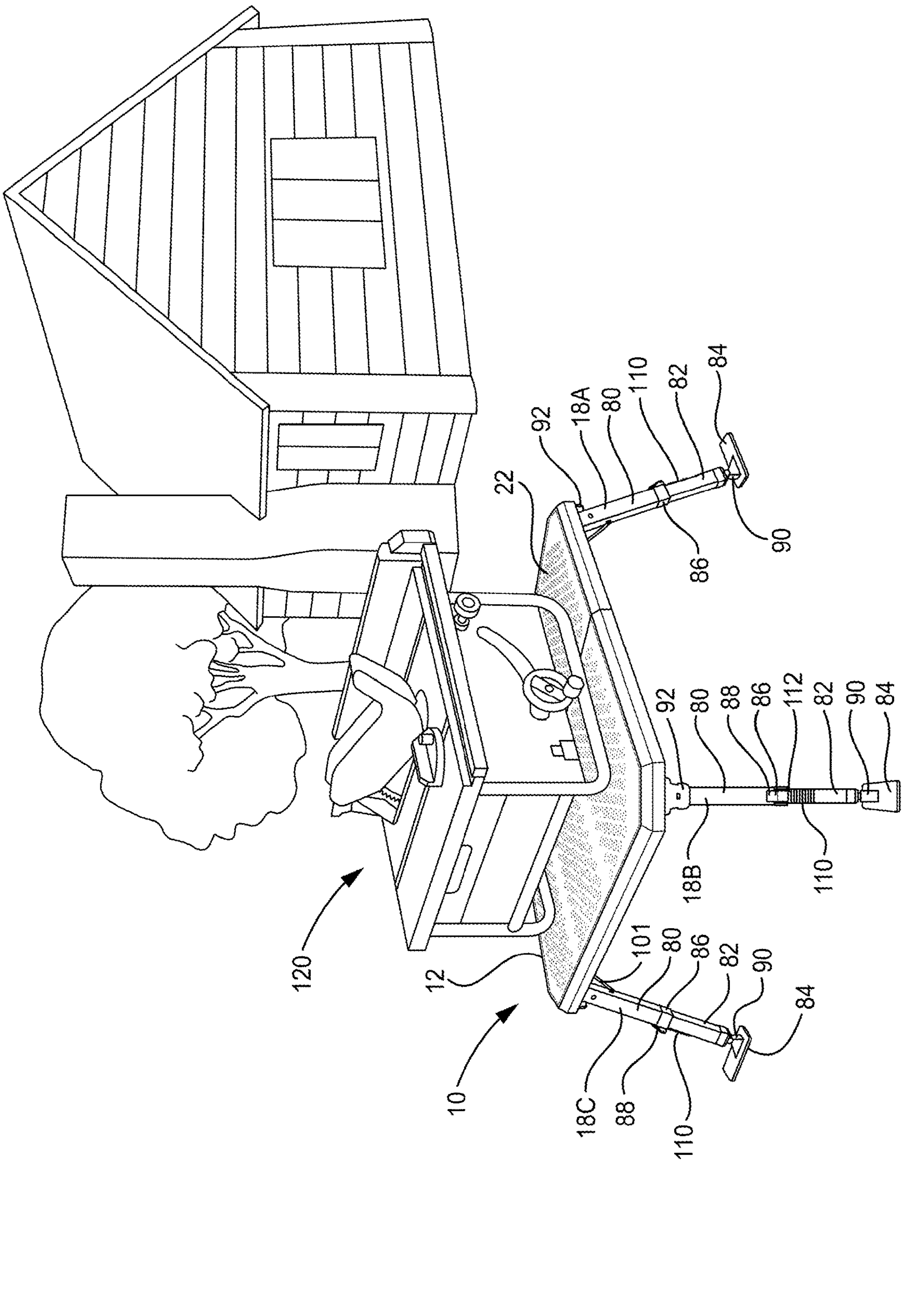
FIG. 19 is a perspective view of the portable blind base of FIG. 1 being used as a support stand for construction equipment in an outdoor environment according to another embodiment or aspect of the present disclosure.

To adjust the lengths of the adjustable support member 18 and, more specifically, to adjust the length of the telescoping extension 82 extending out from the base portion of the adjustable support member 18, a hunter must press the adjustment flap 88 in a direction toward the base portion 80. The telescoping extension 82 includes a plurality of adjustment steps 110 on an outer surface thereof. The adjustment steps 110 engage an adjustment stop 112 that is located on the opposing end of the adjustment flap 88. By pressing the adjustment flap 88 toward the base portion 80, the adjustment stop 112 tilts away from the telescoping extension 82 and adjustment steps 110. This permits the telescoping portion 82 to slide out from the base portion 80. When a desirable length of the telescoping portion 82 has been slid out from the base portion 80, the hunter can release the adjustment flap 88, causing the adjustment stop 112 to tilt back toward the telescoping extension 82 and engage with one of the adjustment steps 110. The engagement between the adjustment stop 112 and step 110 prevents the telescoping extension 82 from sliding back into the base portion 80 and allows the adjustable supports 18 to support the base 12 in the support position. Each of the four adjustable supports 18A, 18B 18C, 18D is individually adjustable, allowing a hunter to place the portable hunting blind base 10 in the support position on ground surfaces that have different heights, as shown in FIG. 19. A bottom surface of the foot 84 may include enhanced gripping features dependent on the terrain to ensure a secure foothold for the portable hunting blind base 10. The foot hinge 90 also allows the foot 84 to rest on uneven ground 6 so long as the enhanced gripping features provide enough friction between the foot 84 and the ground surface 6 to prevent sliding. When a hunter is finished hunting, they can reassemble the portable hunting blind base 10 into the transport position and wheel it away.

It is also contemplated that the portable hunting blind base 10 can be moveable without transitioning the entire portable hunting blind base 10 from the support position to the transport position. While not shown, the base portions 80 of the adjustable supports 18A, 18B, 18C, 18D can have additional attachment mechanisms located near or on the adjustment control pieces 86. This additional attachment mechanism can be configured to connect, attach, or otherwise receive one of the wheels 20A, 20B, so that the wheels 20A, 20B can operate and move the portable hunting blind base 10 when the telescoping extensions 82 are entirely received within their respective base portions 80. By attaching the wheels 20A, 20B to two adjustable supports 18A, 18B, 18C, 18D that are located across from one another, a user of the portable hunting blind base 10 can reattach the handles 16A, 16B with the base 12 in the unfolded position and move the portable hunting blind base 10 some distance. This configuration may be utilized when a user desires to move the portable hunting blind base 10 a short distance where transitioning the portable hunting blind base 10 from the support to the transport position may be impracticable or undesirable.

It is also contemplated that the portable hunting blind base 10 can be used for purposes other than hunting. For example, in FIG. 19, a blind base 10 can be moved outside in the same manner as previously described and arranged to support a saw table 120. The saw table 120 and blind base 10 can be arranged in various locations to make it easier for a user to cut and transport wood in remote locations that may have uneven terrain.

The blind base 10 can also generally be used in outdoor construction. When used in construction, the blind base 10 can be placed on a hill side or otherwise uneven ground as described above to provide a flat surface on which to do work. This allows workers to undertake various activities immediately at the construction site without the need to move back and forth from uneven to flat ground. The blind base 10 can also be used at construction sites to provide a flat surface on which workers can store and support different items. The blind base 10 can also be moved to provide a flat surface at different, uneven locations, at the same construction site.

The blind base 10 can be used in other circumstances not shown in the figures. For example, the blind base 10 can be used to support a ladder or other device that requires a flat surface to operate. The blind base 10 can be used to store or support items, such as a sleeping bag or tent, in instances where it is desirable for these objects to be held above the ground or on a flat surface.

When using the blind base 10, it may be desirable to transport the blind base 10 using methods different than the wheel arrangement 14 previously described. It is contemplated that the blind base 10 can be attached to vehicles, such as an off-road bike, ATV, or the like to provide for easy transportation of the blind base 10. The different holes (shown, but not numbered) extending through the base 12 can be used to tie or otherwise attach the blind base 10 to a part of an off-road vehicle to provide quick transport.

While various aspects of the portable hunting blind base 10 were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims, and all changes to the invention that fall within the meaning and the range of equivalency of the claims are to be embraced within their scope.

The invention claimed is:

1. A portable stand comprising:

a base member transitionable between a folded position and an unfolded position;

at least one wheel arrangement comprising at least one wheel, the at least one wheel arrangement detachably mounted to the base member; and a plurality of adjustable support members configured to support the base member on a surface, wherein the portable stand is transitionable between a first position and a second position, wherein, in the first position, the base member is in the folded position, and the at least one wheel arrangement is mounted to the folded base member, thereby permitting a user of the portable stand to transport the portable stand across a distance, and wherein, in the second position, the base member is in the unfolded position, the at least one wheel arrangement is detached from the base member, and the plurality of adjustable support members are in contact with the surface, thereby permitting the user of the stand to be supported by the unfolded base member, wherein a first side of the base member comprises at least one attachment bar disposed at least partially therein, wherein the at least one wheel arrangement comprises at least one attachment hook corresponding to the at least one attachment bar, wherein the at least one attachment bar and the at least one attachment hook are configured to mount the at least one wheel arrangement to the base member, wherein the at least one wheel arrangement comprises a first wheel support and a second wheel support, the first wheel support and the second wheel support each having at least one attachment hook located at a first end and configured to engage with a corresponding at least one attachment bar, wherein the first wheel support and the second wheel support define at least one wheel receiving shaft configured to receive at least a portion of the at least one wheel therein, and wherein the at least one wheel receiving shaft is located at a second end, opposite the first end.

2. The portable stand of claim 1, wherein the first side of the base member comprises at least four attachment bars disposed at least partially therein, and wherein the at least one wheel arrangement comprises at least four attachment hooks, each corresponding to one of the at least four attachment bars.

3. The portable stand of claim 1, wherein the at least one wheel receiving shaft comprises:

a first wheel receiving shaft, configured to receive a first wheel therein; and a second wheel receiving shaft, configured to receive a second wheel therein, wherein the first wheel receiving shaft and the second wheel receiving shaft share a common axis, and wherein the first wheel support and the second wheel support, upon their respective at least one attachment hook engaging with their respective at least one attachment bar, are configured to align so that a portion of each defines the first wheel receiving shaft and the second wheel receiving shaft.

4. The portable stand of claim 3, wherein the first wheel comprises a first extension and the second wheel comprises a second extension, the first extension being configured to be received within the first wheel receiving shaft, and the second extension being configured to be received within the second wheel receiving shaft.

5. The portable stand of claim 4, wherein the first wheel receiving shaft and the second wheel receiving shaft comprise a locking pin configured to be displaceable relative to the receiving shafts and configured to engage and lock the first and second extensions in their respective receiving shafts.

6. The portable stand of claim 1, wherein, in the folded position, the plurality of adjustable support members are held within the base member.

7. The portable stand of claim 1, wherein the plurality of adjustable support members are configured to support the base member on a surface in the unfolded position, and wherein a length of each of the plurality of adjustable support members is independently adjustable.

8. A portable stand comprising:

a base member transitionable between a folded position and an unfolded position;

a plurality of adjustable support members configured to support the base member on a surface;

at least one handle detachably mounted to the base member; and at least one wheel arrangement comprising at least one wheel, the at least one wheel arrangement detachably mounted to the base member, wherein the portable stand is transitionable between a first position and a second position, wherein in the first position, the plurality of adjustable support members are held within a folded base member, wherein in the second position, the plurality of adjustable support members are configured to extend from a bottom surface of an unfolded base member, wherein a length of each of the plurality of adjustable support members is independently adjustable so that the portable stand can be supported on an uneven surface, wherein a first side of the base member comprises at least one attachment bar disposed at least partially therein, wherein the at least one wheel arrangement comprises at least one attachment hook corresponding to the at least one attachment bar, wherein the at least one attachment bar and the at least one attachment hook are configured to mount the at least one wheel arrangement to the base member, wherein the at least one wheel arrangement comprises a first wheel support and a second wheel support, the first wheel support and the second wheel support each having at least one attachment hook located at a first end and configured to engage with a corresponding at least one attachment bar, wherein the first wheel support and the second wheel support define at least one wheel receiving shaft configured to receive at least a portion of the at least one wheel therein, and wherein the at least one wheel receiving shaft is located at a second end, opposite the first end.

9. The portable stand of claim 8, wherein the plurality of adjustable support members comprise:

a base portion, mounted to the bottom surface of the unfolded base member;

an extension portion, configured to be extendable from the base portion;

a locking member operatively connected to the base portion and configured to lock the extension portion in place relative to the base portion; and a foot, mounted to an end of the extension portion and configured to engage the surface.

10. The portable stand of claim 9, wherein a surface of the extension portion comprises a plurality of steps, wherein the locking member comprises a push tab and a locking tab configured to engage with at least one of the plurality of steps, thereby locking the extension portion in place, and wherein, upon a user pressing the push tab, the locking tab disengages the at least one of the plurality of steps to permit movement.

11. The portable stand of claim 10, wherein at least a portion of the extension portion is telescopically received within the base portion.

12. The portable stand of claim 8, wherein the plurality of adjustable support members are connected to the bottom surface of the unfolded base member by a plurality of mounting brackets, each of the plurality of mounting brackets corresponding to one of the plurality of adjustable support members.

13. The portable stand of claim 12, wherein the plurality of mounting brackets comprise:

a base bracket, connected to the bottom surface of the unfolded base member;

a rotatable bracket leg extending from the base bracket, the rotatable bracket leg configured to be mounted to the base portion of the plurality of adjustable support members; and a hinge pin about which the plurality of adjustable support members rotate, the hinge pin extending through the base support and rotatable bracket leg, thereby connecting the rotatable bracket leg to the base support.

14. The portable stand of claim 12, wherein the rotatable bracket leg is telescopically received within the base portion.

15. The portable stand of claim 12, wherein the plurality of mounting brackets further comprise: a first side bracket and a second side bracket, the first side bracket and the second side bracket defining an opening configured to permit rotation of the rotatable extension and base portion therebetween.

16. A wheel arrangement for use with a portable support, the wheel arrangement comprising:

a first wheel support having a first end and a second end; and a second wheel support having a first end and a second end;

at least one wheel detachably mounted to the first wheel support and the second wheel support at the first ends of each, wherein the first wheel support comprises at least one attachment mechanism at the second end, the at least one attachment mechanism configured to detachably mount the first wheel support to the portable support, and wherein the second wheel support comprises at least one attachment mechanism at the second end, the at least one attachment mechanism configured to detachably mount the second wheel support to the portable support, wherein the first wheel support comprises at least one wheel receiving shaft at the first end and the second wheel support comprises at least one wheel receiving shaft at the first end, wherein the at least one wheel receiving shaft of the first wheel support is configured to align with the at least one wheel receiving shaft of the second wheel support to receive the at least one wheel therein, wherein the wheel arrangement comprises at least one attachment hook corresponding to at least one attachment bar on a portable stand, wherein the at least one attachment bar and the at least one attachment hook are configured to mount the wheel arrangement to the portable stand.

17. The wheel arrangement of claim 16, wherein the at least one wheel comprises a first wheel and a second wheel, wherein the at least one wheel receiving shaft of the first wheel support comprises a first wheel receiving shaft and a second wheel receiving shaft opposing the first wheel receiving shaft at the first end of the first wheel support, wherein the at least one wheel receiving shaft of the second wheel support comprises a first wheel receiving shaft and a second wheel receiving shaft opposing the first wheel receiving shaft at the first end of the second wheel support, wherein the first wheel receiving shaft on the first wheel support is configured to align with the first wheel receiving shaft on the second wheel support to receive the first wheel therein, and wherein the second wheel receiving shaft on the first wheel support is configured to align with the second wheel receiving shaft on the second wheel support to receive the second wheel therein.

* * * * *